United States Patent
Morohoshi et al.

(10) Patent No.: US 6,866,297 B2
(45) Date of Patent: Mar. 15, 2005

(54) WELDED STRUCTURE OF FUEL FILLING CONTAINER AND WELDED PART, AND WELDING METHOD THEREFOR

(75) Inventors: Katsumi Morohoshi, Kanagawa (JP); Hiroshi Kumagai, Kanagawa (JP); Masami Honma, Yokohama (JP); Tomoyuki Satou, Kanagawa (JP); Mitsuo Yamada, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/384,670

(22) Filed: Mar. 11, 2003

(65) Prior Publication Data

US 2003/0173776 A1 Sep. 18, 2003

(30) Foreign Application Priority Data

Mar. 15, 2002 (JP) .................................... 2002-071296
Jul. 15, 2002 (JP) .................................... 2002-206132

(51) Int. Cl.$^7$ .............................................. F16L 13/02
(52) U.S. Cl. ................ 285/21.1; 285/136.1; 285/285.1; 285/288.1; 285/423; 137/202
(58) Field of Search ................. 285/21.1, 285.1, 285/288.1, 136.1, 423; 137/202, 43

(56) References Cited

U.S. PATENT DOCUMENTS

| | | | |
|---|---|---|---|
| 5,139,043 A | | 8/1992 | Hyde et al. |
| 5,404,907 A | * | 4/1995 | Benjey et al. ............... 137/587 |
| 5,992,441 A | * | 11/1999 | Enge et al. .................. 137/202 |
| 6,286,539 B1 | * | 9/2001 | Nishi et al. .................. 137/202 |
| 6,289,915 B1 | * | 9/2001 | Nulman et al. ............... 137/43 |
| 6,305,568 B1 | * | 10/2001 | Suzuki et al. ................ 220/562 |
| 6,331,021 B1 | * | 12/2001 | Wilson et al. ............... 285/239 |
| 6,408,867 B2 | * | 6/2002 | Aoki et al. .................. 137/202 |
| 6,592,100 B2 | * | 7/2003 | Chou et al. .................. 251/144 |
| 6,662,820 B2 | * | 12/2003 | Dunkle ........................ 137/202 |
| 6,676,165 B2 | * | 1/2004 | Iio et al. ..................... 285/21.1 |
| 6,679,282 B2 | * | 1/2004 | Aoki et al. .................. 137/202 |
| 2004/0011401 A1 | * | 1/2004 | Kato ........................... 137/202 |

FOREIGN PATENT DOCUMENTS

JP  2000-8981 A  1/2000

OTHER PUBLICATIONS

Testing Methods for Determination of the Water Vapour Transmission Rate of Moisture–Proof Packaging Materials (Dish Method), Japanese Industrial Standard, Aug. 2, 1976, pp. 1–5, JIS Z 0208–1976, Japanese Standards Association.
Motor Gasoline, Japanese Industrial Standard, Feb. 22, 1999, pp. 1–4, JIS K 2202:1999, Japanese Standards Association.

* cited by examiner

*Primary Examiner*—Eric K. Nicholson
(74) *Attorney, Agent, or Firm*—Foley & Lardner LLP

(57) ABSTRACT

A welded structure constituted of a fuel filling container having an opening, and a welded part including a pipe-shaped section whose one end is disposed in the opening of the fuel filling container. A welding section is fixedly disposed around the outer periphery of the pipe-shaped section. The welding section is welded through a welding surface to the outer surface of the fuel filling container. In the welded structure, the welding section of the welded part includes a welding strength providing layer and a fuel permeation resistance layer which are coaxial with the pipe-shaped section of the welded part and radially laminated to define the annular welding surface. Additionally, at least an inner peripheral surface portion of the pipe-shaped section and an outer peripheral surface portion of the other end portion of the pipe-shaped section are formed of a fuel permeation resisting material.

14 Claims, 11 Drawing Sheets

WELDED STRUCTURE OF FUEL FILLING CONTAINER AND WELDED PART, AND WELDING METHOD THEREFOR

BACKGROUND OF THE INVENTION

This invention relates to improvements in a welded structure in which a welded part such as fuel tube or the like and a fuel filling container such as a fuel tank or the like are connected with each other under welding, and in a method of welding the welded part and the fuel filling container to form the welded structure.

Hitherto a fuel filling container such as a fuel tank or the like has been in general formed of a material whose main component is high density polyethylene (HDPE) under blow molding from the viewpoints of moldability, fuel resistance, impact resistance and production cost. Additionally, a multi-layer (for example, 5 layers) structure has been recently extensively employed for the wall of the fuel filling container, in which a layer of high density polyethylene is bonded through an adhesive layer to a barrier layer of ethylene-vinyl alcohol copolymer or nylon resin.

Concerning the welded part to be installed to the fuel filling container, it is general to form the welded part of a synthetic resin which is the same with or similar to that of the fuel filling container because the welded part formed of such a resin can be bonded to the fuel filling container by a simple welding operation using a heated plate or the like. In this regard, the welded part formed of high density polyethylene, modified polyolefin or the like is extensively used. However, it is essential to reduce fuel permeation through the welded part in order to cope with future fuel permeation regulation. Hence, it is eagerly required to so arrange the welded part as to be reduced in fuel permeation as compared with the welded part formed of high density polyethylene. An example of similar techniques is disclosed in U.S. Pat. No. 5,139,043.

SUMMARY OF THE INVENTION

However, drawbacks have been encountered in the above conventional techniques. Specifically, although the welded part requires a high welding strength between it and the fuel filling container as the most important performance, using materials other than high density polyethylene tends to lower the welding strength.

In view of the above, it is an object of the present invention to provide an improved welded structure of a fuel filling container and a welded part, and a welding method for the welded structure, by which drawbacks encountered in similar conventional techniques can be effectively overcome.

Another object of the present invention is to provide an improved welded structure of a fuel filling container and a welded part, and a welding method for the welded structure, which can achieve both maintaining a high welding strength between the fuel filling container and the welded part and improving a fuel permeation resistance through the welded structure.

The present inventors have earnestly made much studies on welded parts to be installed to the fuel filling container, such as a fuel cut-off valve, a filler neck valve and a vent tube, in order to allow fuel to flow through a pipe, a tube or the like between a fuel filling container such as a fuel tank or the like and other parts. Such present inventor's studies have resulted in such a welding technique which remarkably lowers the fuel permeation through a joining section between the fuel filling container and the welded part, through an interface between the welded part and a joined part to be joined to the welded part, while providing a high welding strength between them.

An aspect of the present invention resides in a welded structure comprising a fuel filling container having a section defining an opening. A welded part includes a pipe-shaped section which has a first end portion disposed in the opening of the fuel filling container, and an annular welding section fixedly disposed around the outer periphery of the pipe-shaped section. The welding section is welded through an annular welding surface to an outer surface of the fuel filling container at a section surrounding the opening of the fuel filling container. In the welded structure, the welding section of the welded part includes an annular welding strength providing layer and an annular fuel permeation resistance layer which are coaxial with the pipe-shaped section of the welded part and radially laminated to define the annular welding surface. Additionally, at least an inner peripheral surface portion of the pipe-shaped section and an outer peripheral surface portion of a second end portion of the pipe-shaped section are formed of a fuel permeation resisting material. A joined part is to be connected to the second end portion of the pipe-shaped section.

Another aspect of the present invention resides in a method of welding a welding part to a fuel filling container, in which the welding part includes a pipe-shaped section, and the fuel filling container is formed with an opening. The welding method comprises (a) forming an annular welding section having an annular welding surface facing an outer surface of the fuel filling container, fixedly around an outer periphery of the pipe-shaped section, the welding section including an annular welding strength providing layer, and an annular fuel permeation resistance layer which are coaxial with the pipe-shaped section of the welded part and radially laminated to define the annular welding surface; (b) forming at least an inner peripheral surface portion of the pipe-shaped section and an outer peripheral surface portion of a second end portion of the pipe-shaped section, of a fuel permeation resisting material, a joined part being to be connected to the second end portion; (c) disposing the first end portion of the pipe-shaped section of the welded part in the opening of the fuel filling container; and (d) welding the welding section of the welded part through the welding surface to the outer surface of the fuel filling container at a section around the opening.

BRIEF DESCRIPTION OF THE DRAWINGS

In the drawings, like reference numerals designate like parts and elements throughout all figures, in which.

DETAILED DESCRIPTION OF THE INVENTION

Figure 1A:
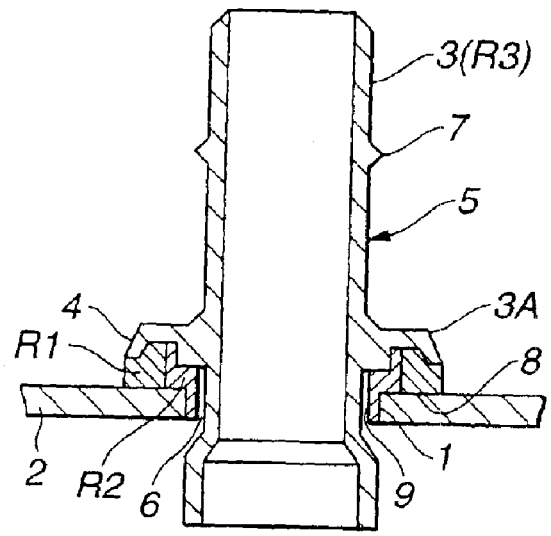
FIG. 1A is a fragmentary sectional view of a first embodiment of a welded structure according to the present invention.

Referring now to FIG. 1A, a first embodiment of a welded structure according to the present invention is illustrated. The welded structure comprises fuel filling container 2 which has opening or through-hole 1 formed through the wall of fuel filling container 2. Fuel is to be contained in fuel filling container 2. Welded part 5 is welded to fuel filling container 2. Welded part 5 includes a pipe-shaped section 3 formed of a synthetic resin (plastic). Annular flange section 3A is formed coaxial and integral with pipe-shaped section 3 in such a manner as to radially outwardly extend. Annular flange section 3A forms part of welding section 4 through which welded part 5 is welded to fuel filling container 2. Welding section 4 further includes annular welding strength providing layer R1 formed of a synthetic resin (plastic), and annular fuel permeation resistance layer R2 formed of a synthetic resin (plastic).

Pipe-shaped section 3 of welded part 5 has lower or first end portion inserted and disposed in opening 1 of fuel filling container 2 in such a manner as to project into fuel filling container 2. Welded part 5 is fixedly installed to fuel filling container 2 through welding section 4. In this embodiment, opening 1, pipe-shaped section 3 and welding section 4 are circular in cross-section and coaxial with each other. Annular space 6 is formed between the outer peripheral surface of pipe-shaped section 3 and the peripheral surface of the wall of fuel filling container 2 which peripheral surface defines opening 1. Upper or second end portion of pipe-shaped section 3 is formed with annular projection 7 which is bulged radially outward and used in such a manner that a joined part (not shown) is fitted to projection 7. Welding section 4 has annular lower surface or welding surface 8 through which welding section 4 is fixed or welded to the outer surface of fuel filling container 2.

Welding strength providing layer R1 and fuel permeation resistance layer R2 of welding section 4 are located beneath flange section 3A and laminated radially to form flat lower surface which serves as welding surface 8 facing the outer surface of the fuel filling container 2. Thus, welding strength providing layer R1 and fuel permeation resistance layer R2 are arranged coaxial to form a lamination surface which is appeared at welding surface 8.

In this embodiment, fuel permeation resistance layer R2 has annular elongated section 9 for covering the inner peripheral surface defining the opening 1, of fuel filling container 2. Pipe-shaped section 3 is formed of fuel permeation resisting material R3 which has the similar function as fuel permeation resistance layer R2.

As the synthetic resin forming welding strength providing layer R1, high density polyethylene is used in order to obtain a sufficient welding strength. The synthetic resin forming fuel permeation resistance layer R2 and fuel permeation resisting material R3 is a blend synthetic resin formed of polyethylene containing 20 to 80% by volume of at least one (blended singly or as a mixture) of polyamide, polyacetal, ethylene-vinyl alcohol copolymer and polyester.

Welded part 5 is fixed to fuel filling container 2 by welding the welding section 4 through welding surface 8 to the outer surface of fuel filling container at a part around opening 1, for example, by using a heated plate or the like, thus forming a welded structure of this embodiment.

In the above welded structure, fuel permeation resistance layer R2 and welding strength providing layer R1 are laminated to be arranged radially inner and outer in the welding section 4, and therefore a sufficient welding strength between fuel filling container 2 and welding section 4 can be obtained with welding strength providing layer R1 while a sufficient fuel permeation resistance performance can be obtained with fuel permeation resistance layer R2. Further, by virtue of elongated section 9 of fuel permeation resistance layer R2, a sufficient fuel permeation resistance performance can be ensured at opening 1 of fuel filling container 2. Furthermore, since pipe-shaped section 3 of welded part 5 is formed of fuel permeation resisting material, fuel permeation through pipe-shaped section 3 can be certainly decreased while the strength of welding section 4 can be further improved, and fuel permeation around the interface between pipe-shaped section 3 and fuel filling container 2 can be securely suppressed.

By virtue of the fact that high density polyethylene is used as the material of welding strength providing layer R1, it is possible that a sufficient welding strength such as a welding yield strength of not less than 20 MPa can be obtained at a welding area of 3 cm² for a usual fuel filling container formed of polyethylene. Additionally, it has been confirmed that a sufficient welding strength can be ensured even in a condition where swelling is made with fuel. Further, in case that welding strength providing layer R1 is formed of high density polyethylene, a sufficient impact strength can be obtained, for example, in a usual fuel filling container formed of polyethylene and having a dimension of about 5 cm3, so that a sufficient impact resistance can be ensured even on the assumption of vehicle collision.

As discussed above, fuel permeation resistance layer R2 and fuel permeation resisting material R3 are formed of the blend synthetic resin (resin) formed of polyethylene containing 20 to 80% by volume of at least one of polyamide, polyacetal, ethylene-vinyl alcohol copolymer and polyester. In this case, the welding breaking or yield strength of the layer R2 or fuel permeation resisting material R3 to welding strength providing layer R1 formed of high density polyethylene or modified polyethylene can be not less than 15 MPa at ordinary temperature. Even during swelling with fuel, a sufficient welding strength can be ensured between fuel permeation resistance layer R2 or fuel permeation resisting material R3 and the welding strength providing layer R1. Furthermore, fuel permeation resistance layer R2 and fuel permeation resisting material R3 have a permeability coefficient of not more than 10 g·mm/m$^2$/day relative to regular gasoline or regular gasoline containing alcohol at a temperature of 40° C. The regular gasoline corresponds to No. 2 in JIS (Japanese Industrial Standard) K 2202.

In the welded structure, it is possible to obtain a sufficient fuel permeation resistance even in case that the thickness (radial dimension) of fuel permeation resistance layer R2 is about ½ of that of whole welding section 4 of welded part 5 as shown in FIG. 1A. In this regard, for example, the permeability coefficient of high density polyethylene relative to the regular gasoline at 40° C. is 45 g·mm/m$^2$/day, and that relative to the regular gasoline containing alcohol at 40° C. is 35 g·mm/m$^2$/day. If fuel permeation resistance layer R2 or fuel permeation resisting material R3 is formed of synthetic resin(s) selected from the group consisting of polyamide, polyacetal, ethylene-vinyl alcohol copolymer and polyester, not only the above properties can be obtained but also cost reduction can be achieved.

Number of the selected synthetic resin(s) from the above group to form fuel permeation resistance layer R2 or fuel permeation resisting material R3 is one or plural. An example of the material of fuel permeation resistance layer R2 or fuel permeation resisting material R3 is a mixture of a blend of polyamide 6 and high density polyethylene and a blend of polyamide 12 and high density polyethylene. In this example, two kinds of polyamides are used. Another example of the material of fuel permeation resistance layer R2 or fuel permeation resisting material R3 is a blend of polyamide 6, ethylene-vinyl alcohol copolymer and high density polyethylene. In this example, polyamide and ethylene-vinyl alcohol copolymer are used. It is preferable that ethylene-vinyl alcohol copolymer contains ethylene in an amount of about 30 mol % from the viewpoint of fuel permeation resistance.

Particularly, it is more effective to use polyamide as fuel permeation resisting material 3 forming pipe-shaped section 3. In this case, the fuel permeation resisting material R3 can have a breaking or yield strength of not lower than 15 MPa to fuel permeation resistance layer R2 at ordinary temperature, so that it can obtain a sufficient bonding strength to fuel permeation resistance layer R2 even during swelling with fuel.

Examples of polyamide used for fuel permeation resistance layer R3 are polyamide 6, polyamide 66, polyamide 11, polyamide 12 and the like. The polyamide used for fuel permeation resistance layer R3 is not limited to particular ones and selectable in accordance with desired necessary physical properties. The above polyamides can be used singly or as a mixture. For example, as fuel permeation resisting material R3, a mixture of polyamide 6 and polyamide 66 may be used. Further, it is possible to mix inorganic materials such as glass fiber, glass bead, talc and/or the like into fuel permeation resisting material R3, which is preferable from the viewpoint of improving the rigidity of fuel permeation resisting material R3. Furthermore, it is possible to mix nano-dispersion material such as montmorillonite and the like into fuel permeation resisting material R3, which makes it possible to further improving suppression of fuel permeation. It is also possible to mix a mixture of glass fiber and the nano-dispersion material into fuel permeation resisting material R3, which is preferable from the viewpoint of achieving both rigidity improvement and fuel permeation reduction of fuel permeation resisting material R3.

The material of fuel permeation resistance layer R2 forming welding section 4 may be a blend synthetic resin formed of polyethylene containing 20 to 80% by volume of at least one (blended singly or as a mixture) of polyacetals, in addition to the above-mentioned fact that fuel permeation resistance layer R2 is formed of the blend synthetic resin of polyethylene containing 20 to 80% by volume of at least one (blended singly or as a mixture) of polyamide and ethylene-vinyl alcohol copolymer. In this case using the polyacetals, polyacetal or polyacetal reinforced with glass fiber is used for fuel permeation resisting material R3 forming pipe-shaped section 3. Even by thus selecting polyacetal, the similar effects as those in case of selecting polyamide or the like as discussed above can be obtained. The polyacetal(s) may be selected from that of copolymer or that of homopolymer.

The material of fuel permeation resistance layer R2 forming welding section 4 may be a blend synthetic resin formed of polyethylene containing 20 to 80% by volume of at least one (blended singly or as a mixture) of polyesters whose representative is polybutylene terephthalate, in addition to the above-mentioned fact that fuel permeation resistance layer R2 is formed of the blend synthetic resin of polyethylene containing 20 to 80% by volume of at least one (blended singly or as a mixture) of polyamide and ethylene-vinyl alcohol copolymer. In this case of using the polyester (s), polyester or polyester reinforced with glass fiber is used for fuel permeation resisting material R3 forming pipe-shaped section 3. Even by thus selecting polyester, the similar effects as those in case of selecting polyamide or polyacetal as discussed above can be obtained.

In the welded structure as shown in FIG. 1A, the whole surface portions to be in contact with fuel are formed of fuel permeation resistance layer R2 and fuel permeation resisting material R3. More specifically, the whole inner peripheral surface portion of pipe-shaped section 3 and the outer peripheral surface portion of the second or upper end portion of pipe-shaped section 3 are formed of fuel permeation resisting material R3 thereby reducing fuel permeation therethrough, while the inner peripheral surface defining opening 1 of the fuel filling container 2 is covered with fuel permeation resistance layer R2 and the inner side of welding section 4 is formed of fuel permeation resistance layer R2 thereby suppressing bonding strength lowering at welding section 4 due to fuel permeation and swelling. By forming the inner side of welding section 4 of fuel permeation resistance layer R2, it is possible to make such a design that the inner surface area of welding section 4 is reduced to narrow the path through which fuel flows, thereby achieving a further improved fuel permeation resistance.

As the material (synthetic resin) used for welding strength providing layer R1 and other than the above-mentioned high density polyethylene, modified polyethylene prepared by introducing maleic anhydride-group to polyethylene may be used to be effective for reducing cost. In this case, however, it is necessary to meet the following two conditions:

As the first condition, the modified polyethylene is required to have an infrared absorbance Z which serves as a measure of modification degree and is represented by Eq. (1), within a range of from more than 0 to not more than 0.8. If the modification degree is increased over 0.8, the welding strength of welded part to fuel filling container 2 formed of polyethylene is lowered while largely degrading the moldability of welding strength providing layer R1.

$$Z = I_{1792}/I_{4250} + I_{1700}/I_{4250} \quad \text{Eq. (1)}$$

where $I_{1792}$, $I_{4250}$, $I_{1700}$ and $I_{4250}$ are respectively the peak heights of infrared absorption spectrums at wave numbers 1792, 4250, 1700 and 4250 cm$^{-1}$.

As the second condition, the modified polyethylene is required to have a density ranging from 925 to 950 kg/m$^3$. If the density is lower than 925 kg/cm$^3$, it is difficult to obtain a sufficient impact strength at a vehicle collision or the like while increasing swelling with fuel and deformation during swelling with fuel. If the density exceeds 950 kg/m$^3$, the moldability of welding strength providing layer R1 is largely degraded so that it is difficult to mold the modified polyethylene into a desired shape under usual injection-molding conditions.

Figure 1B:
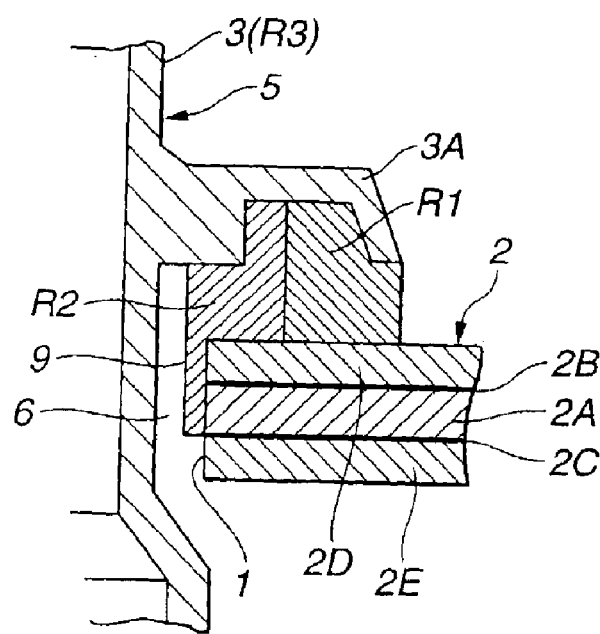
FIG. 1B is an enlarged fragmentary sectional view of a modified example of the first embodiment welded structure of FIG. 1A.

FIG. 1B shows a modified example of the first embodiment of FIG. 1A, in which the wall of fuel filling container 2 has a multi-layer structure. In this example, a plurality of layers are laminated in the direction of thickness of the wall, in which fuel permeation resistance layer 2A formed of ethylene-vinyl alcohol copolymer resin or nylon resin is disposed between outer layer 2D formed of high density polyethylene and inner layer 2E formed of high density polyethylene. Additionally, an adhesive layer 2B is disposed between fuel permeation resistance layer 2A and outer layer 2D to bond layers 2A, 2D, while an adhesive layer 2C is disposed between fuel permeation resistance layer 2A and inner layer 2E to bond layers 2A, 2E. Accordingly, the sectional surface of the multi-layer structure of layers 2A to 2E appears at the peripheral surface defining opening 1, of fuel filling container 2.

In the above fuel filling container 2, fuel permeation resistance layer R2 of the fuel permeation resisting material R3 extends from the outside of fuel filling container 2 and covers a region of from outer layer 2D to fuel permeation resistance layer 2A, at the peripheral surface defining opening 1. In case of FIG. 1B, with elongated section 9 of fuel permeation resistance layer R2 forming welding section 4 of welded part 5, the region of from outer layer 2C to fuel permeation resistance layer 2A is covered. With such an arrangement, a fuel permeation resistance performance for fuel filling container 2 can be ensured while suppressing lowering in bonding strength of welding section 4 owing to fuel permeation and swelling with fuel. In case that a plurality of fuel permeation resistance layers are included in the wall of fuel filling container 2, it is preferable that a region of from the outer layer to the fuel permeation resistance layer located the nearest the outer layer is covered with a member formed of the fuel permeation resisting material, by which similar effects can be obtained.

Figure 2:
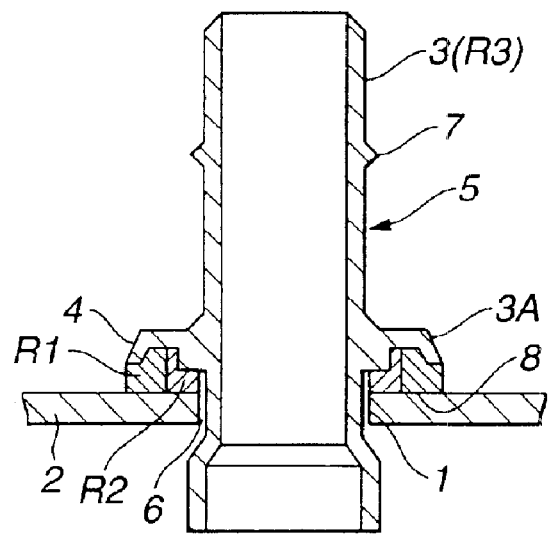
FIG. 2 is a fragmentary sectional view of a second embodiment of the welded structure according to the present invention.

FIG. 2 illustrates a second embodiment of the welded structure according to the present invention, similar to the first embodiment of FIG. 1A with the exception that elongated section (9) for covering the inner peripheral surface defining opening 1, of fuel filling container 2 in the first embodiment is omitted in fuel permeation resistance layer R2 of welding section 4. With this arrangement, although similar effects to those in the first embodiment shown in FIG. 1A can be obtained, the arrangement of FIG. 1A is higher in suppression of lowering the bonding strength due to fuel permeation and swelling with fuel as a matter of course.

Figure 3:
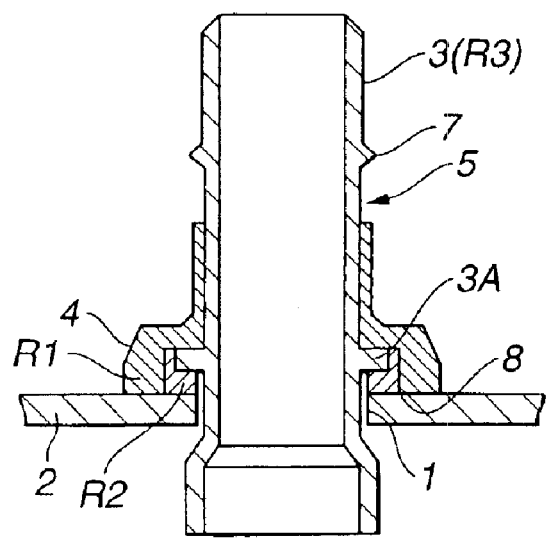
FIG. 3 is a fragmentary sectional view of a third embodiment of the welded structure according to the present invention.

FIG. 3 illustrates a third embodiment of the welded structure according to the present invention, similar to the first embodiment of FIG. 1A with the exception that welding strength providing layer R1 is extended upward over flange section 3A and along the outer peripheral surface of pipe-shaped section 3 in such a manner as to cover about a half of the outer peripheral surface of pipe-shaped section 3 with welding strength providing layer R1. With this arrangement, the mechanical strength of welded part 5 of pipe-shaped section 5 can be improved.

Figure 4:
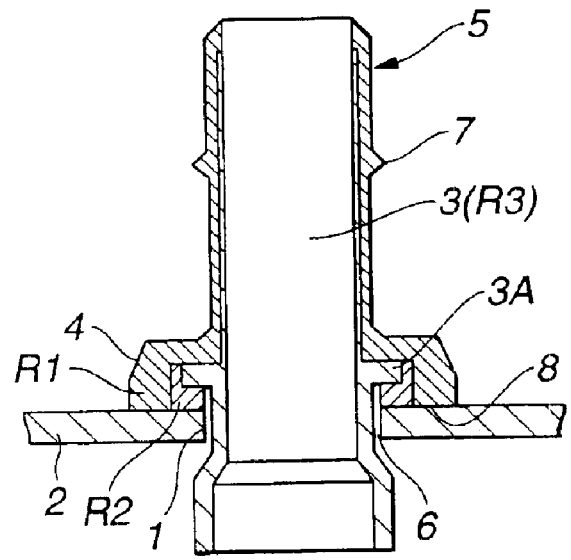
FIG. 4 is a fragmentary sectional view of a fourth embodiment of the welded structure according to the present invention.

FIG. 4 illustrates a fourth embodiment of the welded structure according to the present invention, similar to the third embodiment of FIG. 3 with the exception that welding strength providing layer R1 of the third embodiment is further extended upward to cover the whole peripheral surface of pipe-shaped section 3. In other words, welding strength providing layer R1 forms an outer peripheral surface portion of the upper part of pipe-shaped section 3, while an inner peripheral surface portion of the upper part is formed of fuel permeation resisting material R3. In this embodiment, annular projection 7 for fitting the joined part is formed part of welding strength providing layer R1. With this arrangement, the mechanical strength of pipe-shaped section 3 of welded part 5 can be further improved. Additionally, in case that welding strength providing layer R1 is formed of high density polyethylene, the upper part of pipe-shaped section 3 can be improved in impact resistance.

Figure 5:
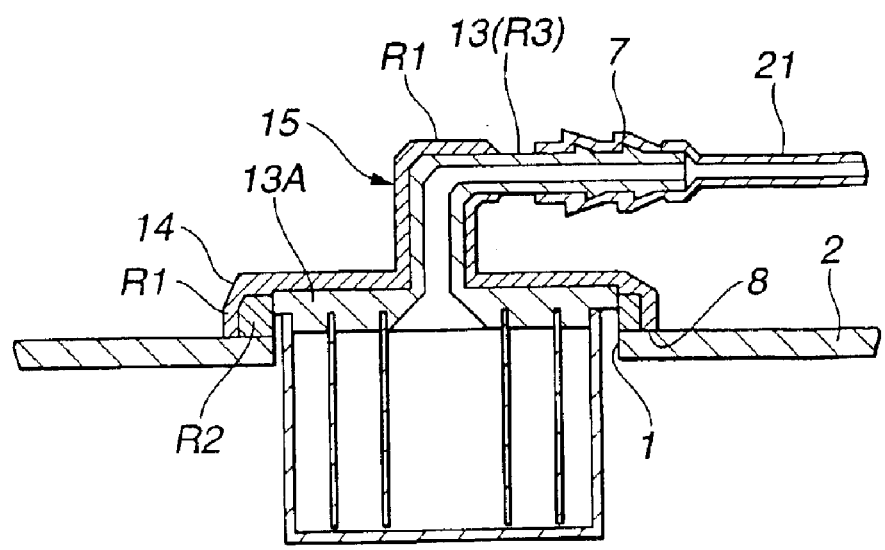
FIG. 5 is a fragmentary sectional view of a fifth embodiment of the welded structure according to the present invention.

FIG. 5 illustrates a fifth embodiment of the welded structure according to the present invention, which is a fuel cut-off valve as another example of the welded structure. Welded part 15 includes pipe-shaped section 13 formed of fuel permeation resisting material R3. Pipe-shaped section 13 is generally L-shaped and integrally formed with flange section 13A which is located at one or lower end of pipe-shaped section 13 and radially outwardly extends. Annular welding section 14 is formed around the peripheral surface of flange section 13A and includes fuel permeation resistance layer R2 and welding strength providing layer R1 which are laminated radially to be respectively located at inner and outer sides. Welding strength providing layer R1 is extended upwardly to cover the upper surface of the flange section 13A and the vertically extending portion of pipe-shaped section 13. Additionally, the other end portion of pipe-shaped section 13 is formed with a plurality of annular projections 7 for fitting the joined part. A plastic tube 21 as the joined part is fit on the other end portion of pipe-shaped section 13.

With this arrangement, similar effects to those in the above embodiments can be obtained. Additionally, since the fitting or outer surface (to which plastic tube 21 is fit) of welded part 15 is formed of fuel permeation resisting material R3, fuel permeation around the fitting part between pipe-shaped section 13 and plastic tube 21 can be extremely minimized.

Figure 6:
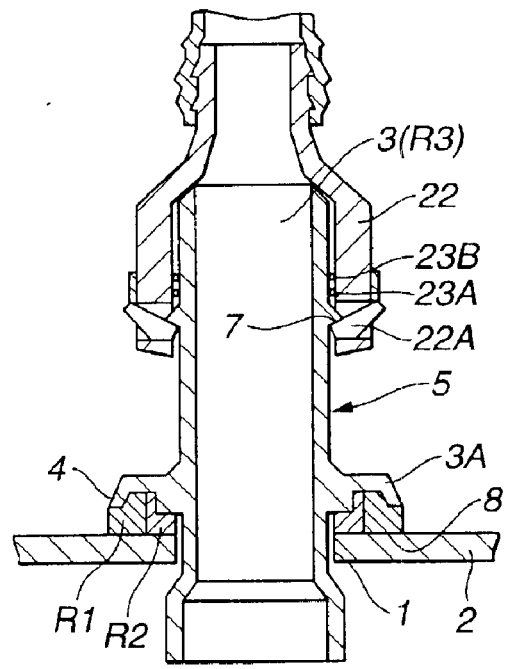
FIG. 6 is a fragmentary sectional view of a sixth embodiment of the welded structure according to the present invention.

FIG. 6 illustrates a sixth embodiment of the welded structure according to the present invention, which is similar to the first embodiment of FIG. 1A except that quick connector 22 as the joined part is connected to the upper end portion of pipe-shaped section 3 of welded part 5. Like a usual connector for fluid, quick connector 22 includes fitting section 22A which is elastically supported by a spring or the like, and O-rings 23A, 23B which are in contact with the outer peripheral surface of pipe-shaped section 3. Accordingly, fitting section 22A is brought into fit with projection 7 for fitting the joined part, in which a high water-tight seal and a high fuel sealing performance can be obtained.

Figure 7:
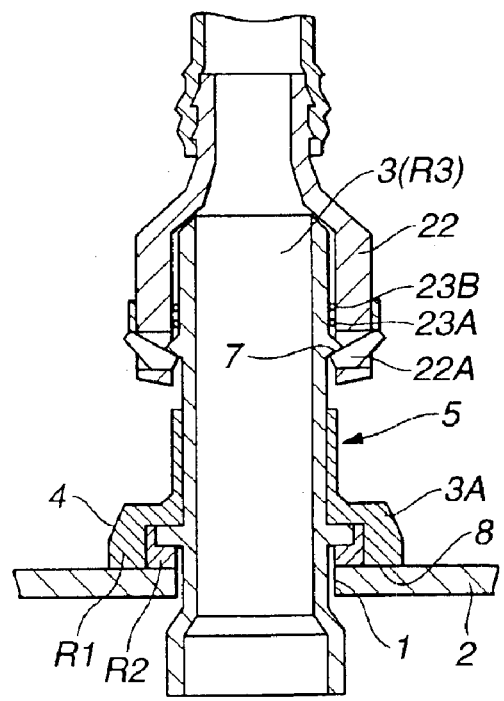
FIG. 7 is a fragmentary sectional view of a seventh embodiment of the welded structure according to the present invention.

FIG. 7 illustrates a seventh embodiment of the welded structure according to the present invention, similar to the second embodiment of FIG. 2 with the exception that quick connector 22 (as the joined part) of FIG. 6 is connected to the upper end portion of pipe-shaped section 3 of welded part 5. In this embodiment, an intermediate part of pipe-shaped section 3 between flange section 3A and quick connector 22 is covered with fuel permeation resisting material R3. In other words, the exposed surface of pipe-shaped section 3 is covered with welding strength providing layer R1 to be protected from impact applied from the outside, thereby providing the welded structure high in impact resistance. The exposed surface is liable to be subjected to impact from the outside.

Figure 8:
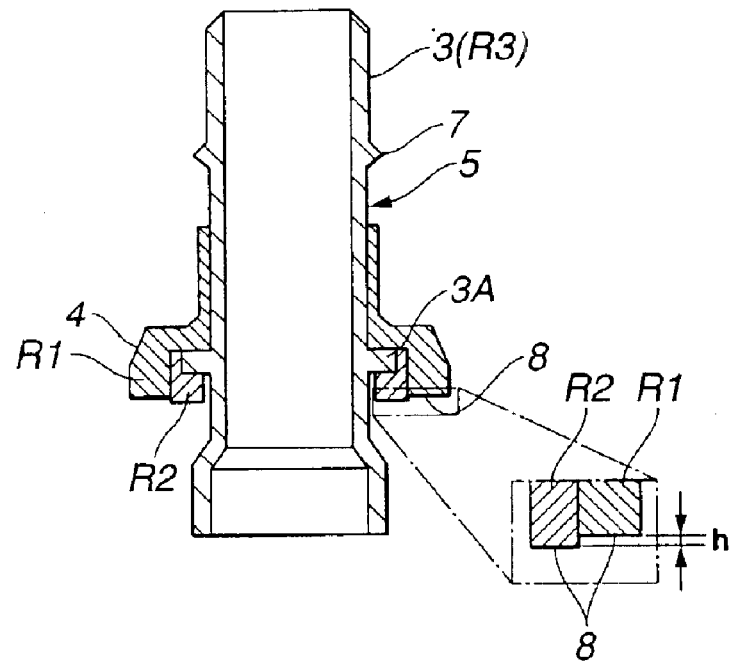
FIG. 8 is a fragmentary sectional view of an eighth embodiment of the welded structure according to the present invention.

FIG. 8 illustrates an eighth embodiment of the welded structure according to the present invention, similar to the third embodiment of FIG. 3 with the exception that welding surface 8 constituted with the lower end surfaces of welding strength providing layer R1 and fuel permeation resistance layer R2 are not flat and stepwise. In other words, the end surfaces of welding strength providing layer R1 and fuel permeation resistance layer R2 are not flush with each other to have a height difference h as clearly indicated in FIG. 8. As a result, during welding of welding section 4 to fuel filling container 2 at welding surface 8, the resin constituting one layer of welding section 4 can be prevented from flowing to the surface of the resin constituting the other layer, so that welding surface 8 can be effectively formed of two clearly separated layers.

More specifically, during welding of welding section 4 to fuel filling container 2, the resin having a relatively low viscosity melts and flows to the side of the resin having a relatively high viscosity. Accordingly, in case that the resin of fuel permeation resistance layer R2 is higher in viscosity than the resin of Welding strength providing layer R1, the lower end surface of R1 is raised by the height difference h relative to that of fuel permeation resistance layer R2 as indicated in FIG. 8, so that the lower end face of fuel permeation resistance layer R2 is projected relative to that of welding strength providing layer R1. In this regard, it is preferable that the height difference h is not less than 0.5 mm in order to obtain a sufficient melt-flow prevention effect. Additionally, it is also preferable that the height difference h is not more than 2 mm in order to flatten welding surface 8 and to obtain a sufficient welding strength.

Figure 9:
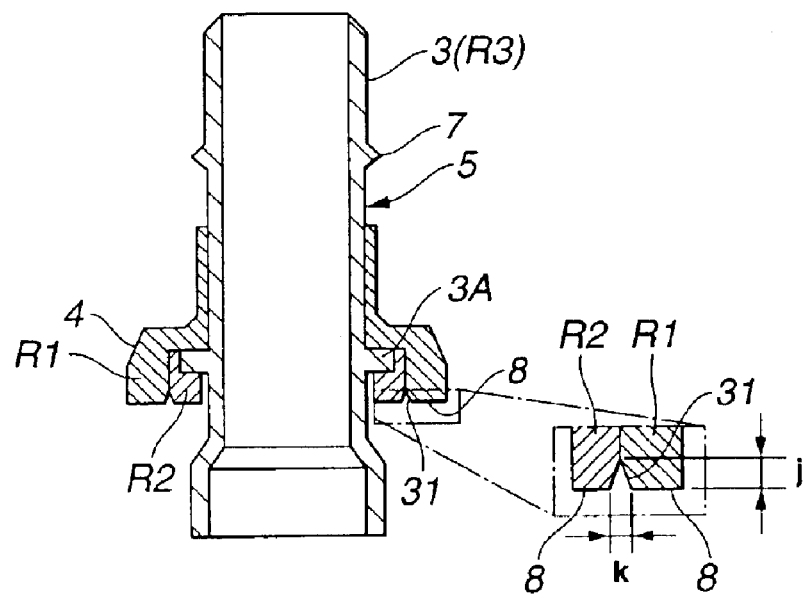
FIG. 9 is a fragmentary sectional view of a ninth embodiment of the welded structure according to the present invention.

FIG. 9 illustrates a ninth embodiment of the welded structure according to the present invention, similar to the third embodiment of FIG. 3 with the exception that annular groove 31 is formed at welding surface 8 and located between the lower end surfaces of welding strength providing layer R1 and fuel permeation resistance layer R2 which are respectively located radially outside and inside. With this arrangement, the resin constituting one layer of welding section 4 can be prevented from flowing to the surface of the resin constituting the other layer similarly to the arrangement of the above eighth embodiment.

In this embodiment, it is preferable that groove 31 has a width (dimension at welding surface 8) k ranging from not less than 0.5 mm to not more than 2 mm, and a depth j ranging from not less than 0.5 mm to not more than 2 mm in order to obtain a sufficient welding strength upon flattening of welding surface 8 after welding of welding section 4 to fuel filling container 2. It will be appreciated that the height difference h in the eighth embodiment of FIG. 8 may be applied also to this embodiment.

Figure 10:
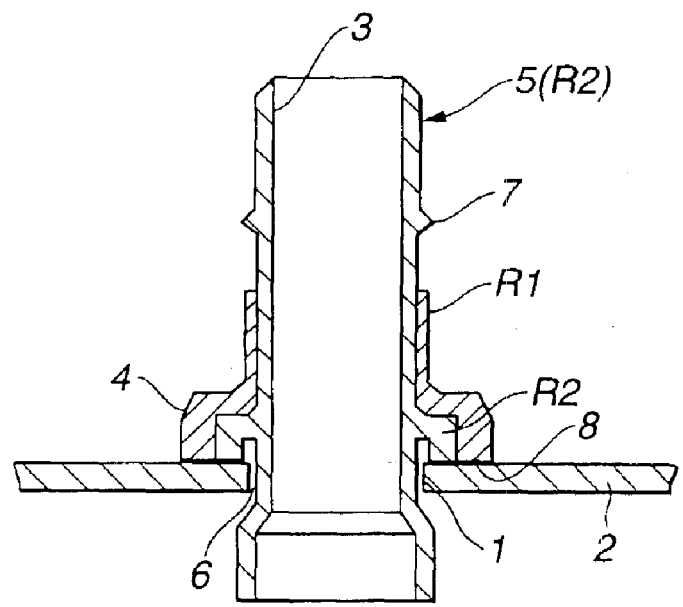
FIG. 10 is a fragmentary sectional view of a tenth embodiment of the welded structure according to the present invention.

FIG. 10 illustrates a tenth embodiment of the welded structure according to the present invention, similar to the third embodiment of FIG. 3 with the exception that pipe-shaped section 3 is formed integral with fuel permeation resistance layer R2 at the radially inner side in welding section 4 of welded part 5, so that pipe-shaped section 3 and flange section 3A are formed of the material of fuel permeation resistance layer R2. Even with this arrangement, similar effects to those in the above embodiments can be attained.

Figure 11:
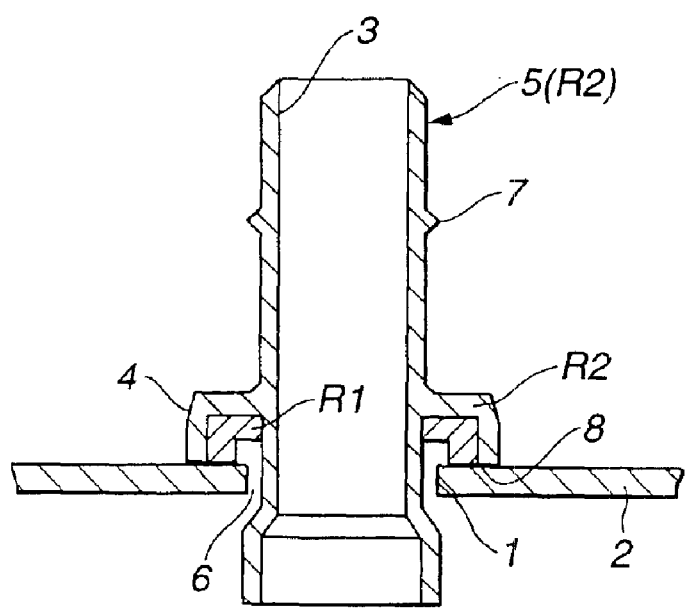
FIG. 11 is a fragmentary sectional view of an eleventh embodiment of the welded structure according to the present invention.

FIG. 11 illustrates an eleventh embodiment of the welded structure according to the present invention, similar to the tenth embodiment of FIG. 10 with the exception that, in welding section 4, welding strength providing layer R1 is located radially inside while fuel permeation resistance layer R2 is located radially outside, in which pipe-shaped section 3 is formed integrally with fuel permeation resistance layer R2. With this arrangement, it is possible to obtain a sufficient welding strength between fuel filling container 2 and welded part 5. However, there is a fear that welding strength providing layer R1 is brought into contact with fuel through opening 1 of fuel filling container 2 so that welding strength providing layer R1 serves as a fuel accumulator and therefore allows fuel to permeate through Welding strength providing layer R1. In view of this, it is more preferable to locate welding strength providing layer R1 outside fuel permeation resistance layer R2 in welding section 4 as shown in FIG. 10.

Figure 12:
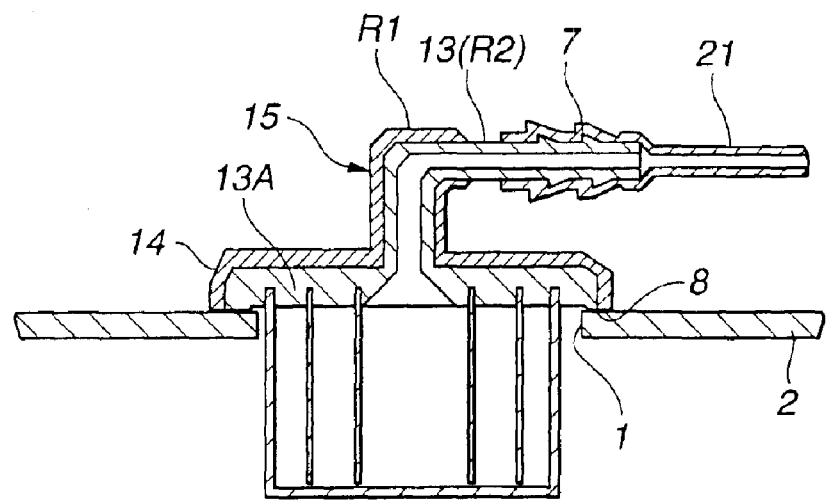
FIG. 12 is a fragmentary sectional view of a twelfth embodiment of the welded structure according to the present invention.

FIG. 12 illustrates a fuel cut-off valve as an eleventh embodiment of the welded structure according to the present invention, similar to that of the fifth embodiment of FIG. 5. In this embodiment, welded part 15 includes pipe-shaped section 13 formed of fuel permeation resisting material R3. Pipe-shaped section 13 is generally L-shaped and integrally formed with flange section 13A which is located at one or lower end of pipe-shaped section 13 and radially outwardly extends. Annular welding section 14 is formed along the periphery of flange section 13A and includes fuel permeation resistance layer R2 and welding strength providing layer R1 which are laminated radially to be respectively located at inner and outer sides. Fuel permeation resistance layer R2 is formed integral with pipe-shaped section 13 so that the pipe-shaped section is also formed of the material of fuel permeation resistance layer R2. Additionally, the other end portion of pipe-shaped section 13 is formed with a plurality of annular projections 7 for fitting the joined part. A plastic tube 21 as the joined part is fit on the other end portion of pipe-shaped section 13.

In this embodiment, similar effects to those in the above embodiments can be attained. Additionally, since the fitting or outer surface (to which plastic tube 21 is fit) of welded part 15 is formed of the material of fuel permeation resistance layer R2, fuel permeation around the fitting part between pipe-shaped section 13 and plastic tube 21 can be extremely minimized.

Figure 13:
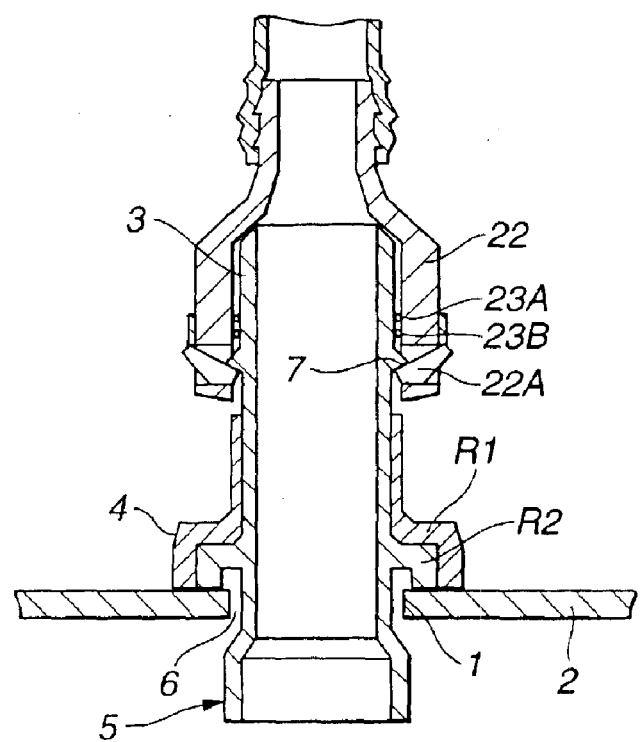
FIG. 13 is a fragmentary sectional view of a thirteenth embodiment of the welded structure according to the present invention.

FIG. 13 illustrates a thirteenth embodiment of the welded structure according to the present invention, which is similar to the tenth embodiment of FIG. 10 except that quick connector 22 as the joined part is connected to the upper end portion of pipe-shaped section 3 of welded part 5. Like a usual connector for fluid, quick connector 22 includes fitting section 22A which is elastically supported by a spring or the like, and O-rings 23A, 23B which are in contact with the outer peripheral surface of pipe-shaped section 3. Accordingly, fitting section 22A is brought into fit with projection 7 for fitting the joined part, in which a high water-tight seal and a high fuel sealing performance can be obtained.

Additionally, in the embodiment of FIG. 13, an intermediate part of pipe-shaped section 3 between flange section 3A and quick connector 22 is covered with fuel permeation resisting material R3. In other words, the exposed surface of pipe-shaped section 3 is covered with welding strength providing layer R1 to be protected from impact applied from the outside, thereby providing the welded structure high in impact resistance. The exposed surface is liable to be subjected to impact from the outside.

Figure 14:
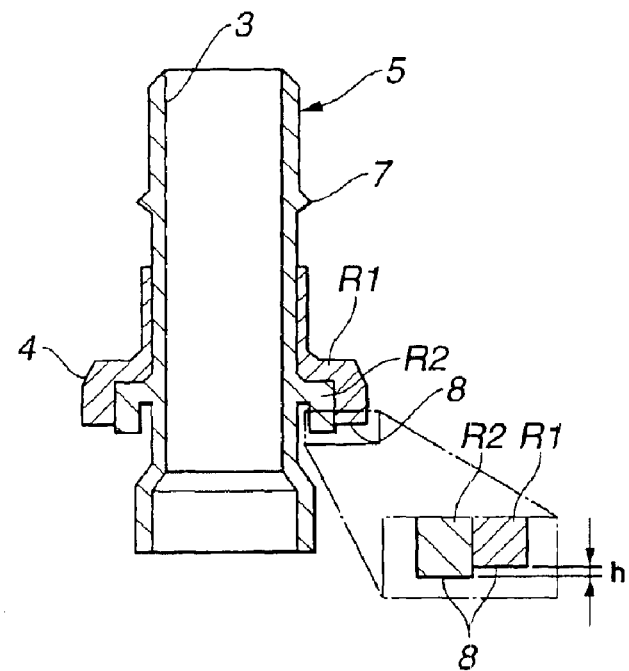
FIG. 14 is a fragmentary sectional view of a fourteenth embodiment of the welded structure according to the present invention.

FIG. 14 illustrates a fourteenth embodiment of the welded structure according to the present invention, similar to the tenth embodiment of FIG. 10 with the exception that welding surface 8 constituted with the lower end surfaces of welding strength providing layer R1 and fuel permeation resistance layer R2 are not flat and stepwise. In other-words, the end surfaces of welding strength providing layer R1 and fuel permeation resistance layer R2 are not flush with each other to have a height difference h as clearly indicated in FIG. 14. As a result, during welding of welding section 4 to fuel filling container 2 at welding surface 8, the resin constituting one layer of welding section 4 can be prevented from flowing to the surface of the resin constituting the other layer, so that welding surface 8 can be effectively formed of two clearly separated layers.

More specifically, during welding of welding section 4 to fuel filling container 2, the resin having a relatively low viscosity melts and flows to the side of the resin having a relatively high viscosity. Accordingly, in case that the resin of fuel permeation resistance layer R2 is higher in viscosity than the resin of welding strength providing layer R1, the lower end surface of R1 is raised by the height difference h relative to that of fuel permeation resistance layer R2 as indicated in FIG. 14, so that the lower end face of fuel permeation resistance layer R2 is projected relative to that of welding strength providing layer R1. In this regard, it is preferable that the height difference h is not less than 0.5 mm in order to obtain a sufficient melt-flow prevention effect. Additionally, it is also preferable that the height difference h is not more than 2 mm in order to flatten welding surface 8 and to obtain a sufficient welding strength.

Figure 15:
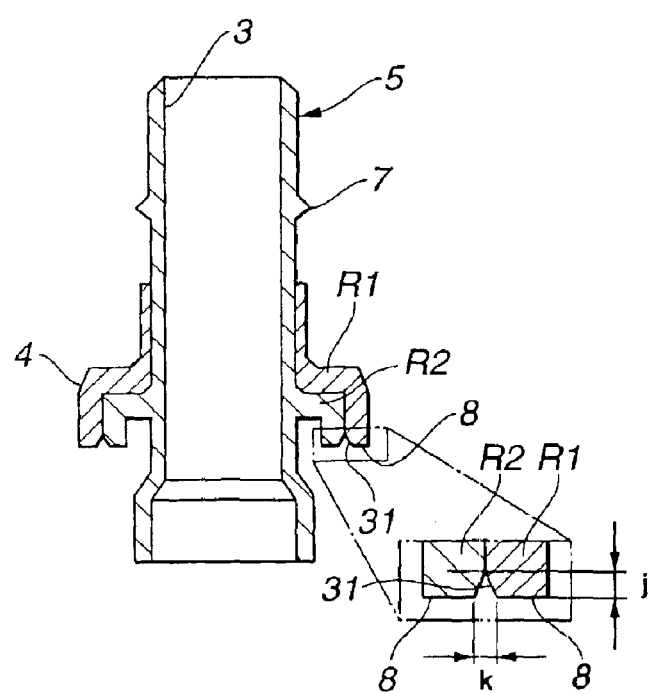
FIG. 15 is a fragmentary sectional view of a sixteenth embodiment of the welded structure according to the present invention.

FIG. 15 illustrates a fifteenth embodiment of the welded structure according to the present invention, similar to the tenth embodiment of FIG. 10 with the exception that annular groove 31 is formed at welding surface 8 and located between the lower end surfaces of welding strength providing layer R1 and fuel permeation resistance layer R2 which are respectively located radially outside and inside. With this arrangement, the resin constituting one layer of welding section 4 can be prevented from flowing to the surface of the resin constituting the other layer similarly to the arrangement of-the above eighth embodiment.

In this embodiment, it is preferable that groove 31 has a width (dimension at welding surface 8) k ranging from not less than 0.5 mm to not more than 2 mm, and a depth j ranging from not less than 0.5 mm to not more than 2 mm in order to obtain a sufficient welding strength upon flattening of welding surface 8 after welding of welding section 4 to fuel filling container 2. It will be appreciated that the height difference h in the eighth embodiment of FIG. 8 may be applied also to this embodiment.

EXAMPLES

The present invention will be more readily understood with reference to the following Examples in comparison with Comparative Examples; however, these Examples are intended to illustrate the invention and are not to be construed to limit the scope of the invention.

Performance of a welded structure including a welded part produced in Examples and Comparative example was evaluated under tests for obtaining an infrared absorbance, a fuel permeation resistance and a welding strength.

[Infrared Absorbance]

A specimen (having a thickness of 0.3 mm) of welding strength providing layer R1 was subjected to measurement of peak heights of infrared absorption spectrums respectively at wave numbers 1792, 4250, 1700 and 4250 cm$^{-1}$ by using a micro-infrared spectroscopic analyzer ("IR$\mu$S/SIRM") produced by Spectra-Tech Inc. Then, an infrared absorbance Z of the specimen was calculated according to the following Eq. (1) including the results of the measurement:

$$Z = I_{1792}/I_{4250} + I_{1700}/I_{4250} \qquad \text{Eq. (1)}$$

where $I_{1792}$, $I_{4250}$, $I_{1700}$ and $I_{4250}$ are respectively the peak heights of infrared absorption spectrums at wave numbers 1792, 4250, 1700 and 4250 cm$^{-1}$.

[Fuel Permeation Resistance]

Figure 16:
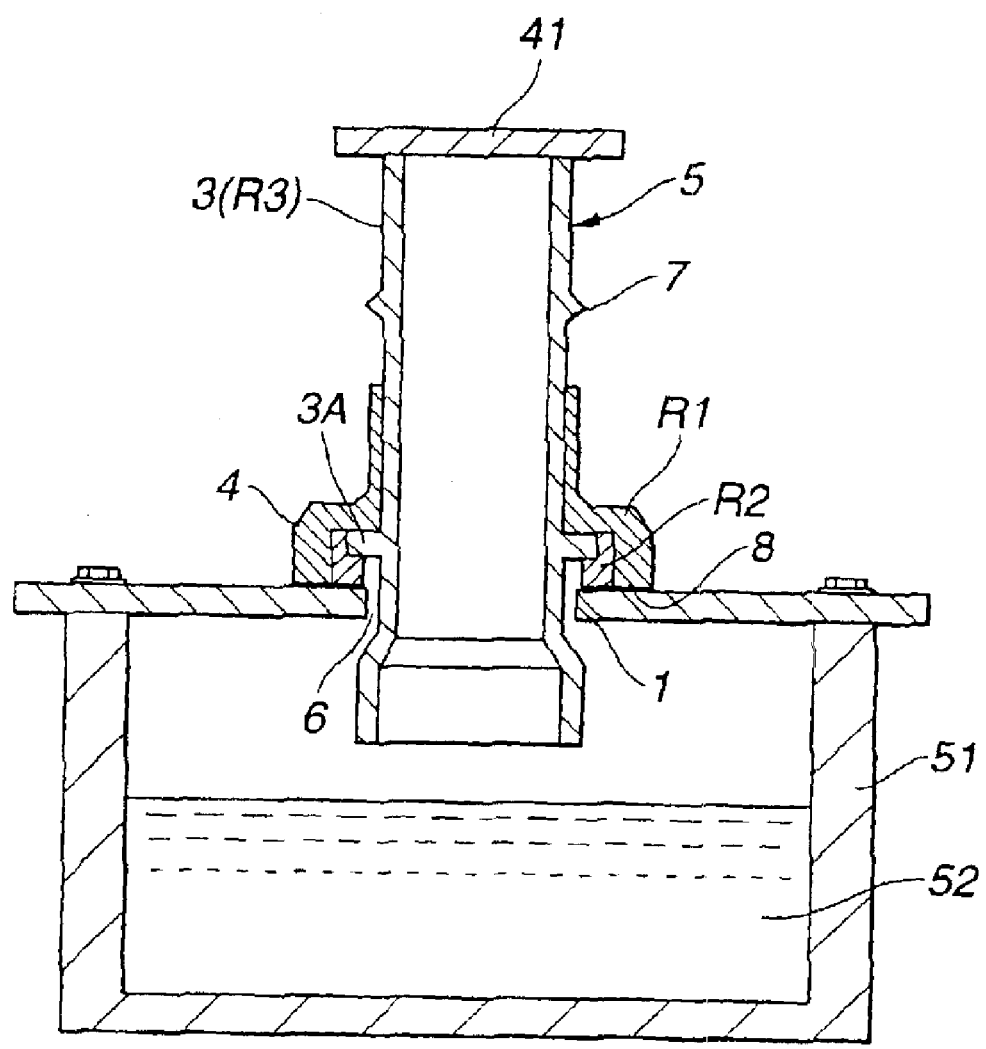
FIG. 16 is a schematic sectional view of a testing apparatus for evaluating a fuel permeation resistance of the welded structures of Examples 1 to 20.
Figure 17:
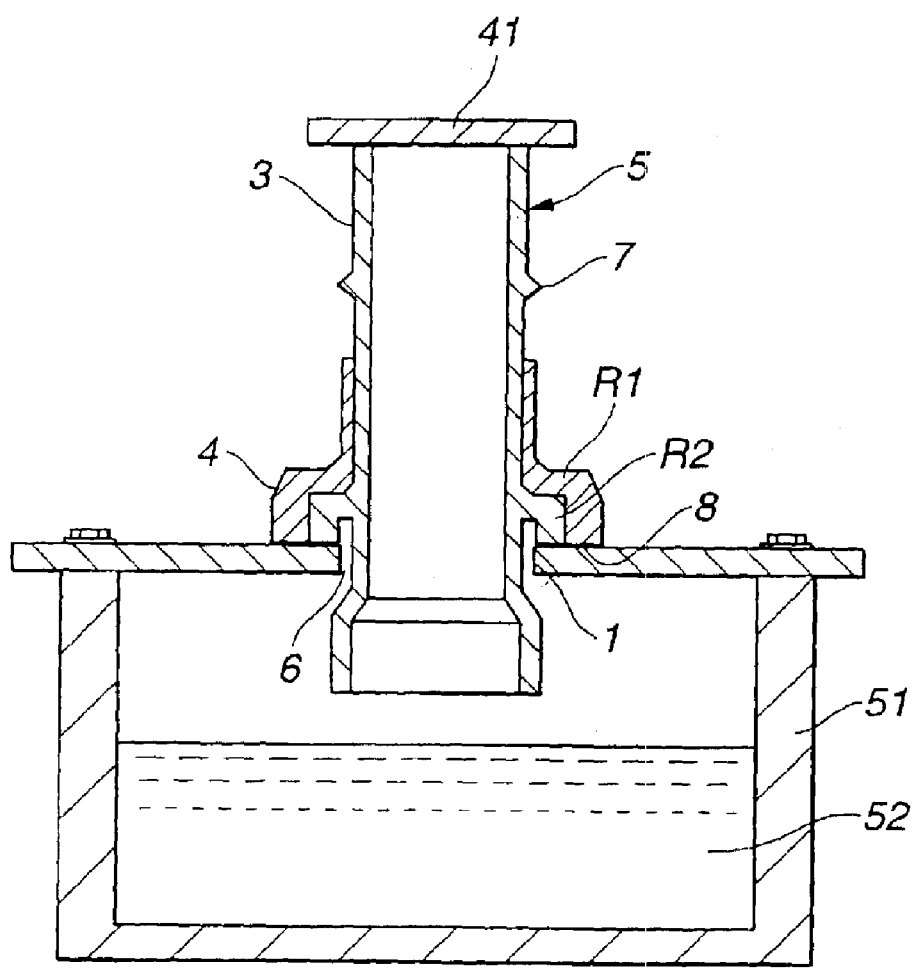
FIG. 17 is a schematic sectional view of a testing apparatus for evaluating a fuel permeation resistance of the welded structures of Examples 21 to 34.
Figure 18:
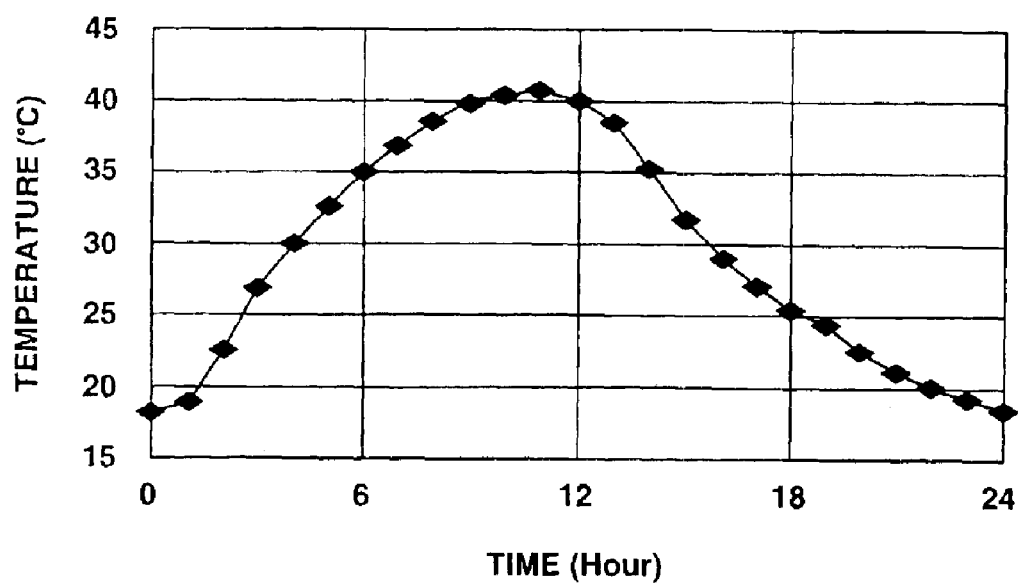
FIG. 18 is a graph showing a temperature cycle with which a test of evaluating the fuel permeation resistance is conducted using the testing apparatus of FIG. 16 or FIG. 17.

A welded part produced in Examples 1 to 34 and Comparative examples 1 to 10 was welded to a laminated synthetic resin board (having a thickness of 5 mm) including layers of. HDPE (high density polyethylene), the modified polyethylene, EVOH (ethylene-vinyl alcohol copolymer), the modified polyethylene and HDPE (the layers having a thickness ratio of 45.5/3/3/3/45.5), thereby preparing a welded structure. The laminated synthetic resin board was fixedly mounted on aluminum container (51) according to JIS (Japanese Industrial Standard) Z 0208 in such a manner as to close the aluminum container, generally as shown in FIGS. 16 and 17. The aluminum container was filled with a test fuel or mixture fuel (52) of 90 parts by volume of regular gasoline and 10 parts by volume of ethanol. The regular gasoline corresponded to No. 2 in JIS (Japanese Industrial Standard) K 2202. Under this condition, the welded structure was maintained constantly at 60° C. for 500 hours. Thereafter, a fuel permeation coefficient was measured under a temperature cycle shown in FIG. 18 and in the following manner:

Concerning Examples 1 to 15, 18 to 20 and Comparative examples 1 to 5, flat plate (having a thickness of 5 mm) 41 formed of the same material as fuel permeation resistance layer R2 was welded to the upper open end of pipe-shaped section 3 so as to close the upper open end as shown in FIG. 16. Then, about ½ the inner volume of aluminum container 51 was filled with the above test fuel 52.

Concerning Examples 16 and 17, the upper open end of pipe-shaped section 3 was closed by plugging the joined part with a metal plug. Then, about ½ the inner volume of aluminum container 51 was filled with the above test fuel 52.

Concerning Examples 21 to 30, 32 to 34 and Comparative examples 6 to 10, flat plate (having a thickness of 5 mm) 41 formed of the same material as fuel permeation resistance layer R2 was welded to the upper open end of pipe-shaped section 3 so as to close the upper open end as shown in FIG.

17. Then, about ½ the inner volume of aluminum container 51 was filled with the above test fuel 52.

Concerning Example 31, the upper open end of pipe-shaped section 3 was closed by plugging the joined part with a metal plug. Then, about ½ the inner volume of aluminum container 51 was filled with the above test fuel 52.

[Welding Strength]

A welded part produced in Examples and Comparative examples was welded to a fuel tank (fuel filling container) for an automotive vehicle in such a manner as to have a welding area of about 7.9 cm² at which the welded part was welded to the fuel tank. The fuel tank was formed of the above-mentioned laminated synthetic resin board. Then, the fuel tank was filled with the test fuel or mixture fuel of 90 parts by volume of the regular gasoline and 10 parts by volume of ethanol, and the welded structure including the fuel tank and the welded part was kept at 60° C. for 2400 hours. Thereafter, a welding strength between the fuel tank and the welded part was measured as follows by using a welding strength measuring apparatus ("Autograph AG-1") produced by Shimadzu Corporation: The fuel tank was fixedly supported by a jig in such a manner that the welded part was separate from the jig. Then, the welded part was pushed in a direction to be separated from the fuel tank at a speed of 50 mm/min. under a force to be applied to the welded part. When the welded part was separated from the fuel tank, the force applied to the welded part was read. The read force was divided by the welded area (7.9 cm²) to obtain the welding strength (MPa) shown in Tables 1A and 1B, and Table 2.

Example 1

Polyethylene modified with maleic anhydride was used as a resin A of welding strength providing layer R1. The modified polyethylene had a density of 925 kg/cm³ and an infrared absorbance Z of 0.3. A blend of polyamide 6 (PA6) and high density polyethylene was used as a resin B of fuel permeation resistance layer R2, in which the blend had a mixing volume ratio of 50/50 (the polyamide/the polyethylene). Polyamide 6 reinforced with glass fiber was used as a resin C of fuel permeation resisting material R3. The glass fiber-reinforced polyamide 6 contained 30% by weight of glass fiber. By employing the resins A, B and C, a welded part of a welded structure in FIG. 1 was produced. The thus produced welded part exhibited an excellent performance including a fuel permeation coefficient (for the welded part) of 0.2 mg/part(the welded part)/day and a welding strength of 22.3 MPa.

Example 2

High density polyethylene was used as a resin A of Welding strength providing layer R1. A blend of polyamide 6 (PA6) and high density polyethylene was used as a resin B of fuel permeation resistance layer R2, in which the blend had a mixing volume ratio of 50/50 (the polyamide/the polyethylene). Polyamide 6 was used as a resin C of fuel permeation resisting material R3. By employing the resins A, B and C, a welded part of a welded structure in FIG. 2 was produced. The thus produced welded part exhibited an excellent performance including a fuel permeation coefficient (for the welded part) of 0.5 mg/part(the welded part)/day and a welding strength of 19.1 MPa.

Example 3

A procedure of Example 2 was repeated with the exception that the blend of polyamide 6 (PA6) and high density polyethylene used as the resin B of fuel permeation resistance layer R2 had a mixing volume ratio of 80/20 (the polyamide/the polyethylene), thereby producing a welded part of a welded structure as shown in FIG. 2. The thus produced welded part exhibited an excellent performance including a fuel permeation coefficient (for the welded part) of 0.7 mg/part(the welded part)/day and a welding strength of 15.6 MPa.

Example 4

A procedure of Example 2 was repeated with the exception that the blend of polyamide 6 (PA6) and high density polyethylene used as the resin B of fuel permeation resistance layer R2 had a mixing volume ratio of 20/80 (the polyamide/the polyethylene), thereby producing a welded part of a welded structure as shown in FIG. 2. The thus produced welded part exhibited an excellent performance including a fuel permeation coefficient (for the welded part) of 0.5 mg/part(the welded part)/day and a welding strength of 20.3 MPa.

Example 5

A procedure of Example 2 was repeated with the exception that polyamide 6 reinforced with glass fiber (containing 30% by weight of glass fiber) was used as the resin C in place of polyamide 6, thereby producing a welded part of a welded structure as shown in FIG. 2. The thus produced welded part exhibited an excellent performance including a fuel permeation coefficient (for the welded part) of 0.5 mg/part(the welded part)/day and a welding strength of 19.5 MPa.

Example 6

A procedure of Example 2 was repeated with the exception that polyethylene modified with maleic anhydride was used as the resin A of welding strength providing layer R1, the modified polyethylene having a density of 950 kg/cm³ and an infrared absorbance Z of 0.3, and polyamide 6 reinforced with glass fiber (containing 30% by weight of glass fiber) was used as the resin C of fuel permeation resisting material R3, thereby producing a welded part of a welded structure as shown in FIG. 2. The thus produced welded part exhibited an excellent performance including a fuel permeation coefficient (for the welded part) of 0.5 mg/part(the welded part)/day and a welding strength of 21.2 MPa.

Example 7

A procedure of Example 2 was repeated with the exception that polyethylene modified with maleic anhydride was used as the resin A of welding strength providing layer R1, the modified polyethylene having a density of 925 kg/cm³ and an infrared absorbance Z of 0.3, and polyamide 6 reinforced with glass fiber (containing 30% by weight of glass fiber) was used as the resin C of fuel permeation resisting material R3, thereby producing a welded part of a welded structure as shown in FIG. 2. The thus produced welded part exhibited an excellent performance including a fuel permeation coefficient (for the welded part) of 0.7 mg/part(the welded part)/day and a welding strength of 20.9 MPa.

Example 8

A procedure of Example 2 was repeated with the exception that polyethylene modified with maleic anhydride was used as the resin A of welding strength providing layer R1, the modified polyethylene having a density of 940 kg/cm$^3$ and an infrared absorbance Z of 0.8, and polyamide 6 reinforced with glass fiber (containing 30% by weight of glass fiber) was used as the resin C of fuel permeation resisting material R3, thereby producing a welded part of a welded structure as shown in FIG. 2. The thus produced welded part exhibited an excellent performance including a fuel permeation coefficient (for the welded part) of 0.6 mg/part(the welded part)/day and a welding strength of 17.3 MPa.

Example 9

A procedure of Example 2 was repeated with the following exceptions: Polyethylene modified with maleic anhydride was used as the resin A of welding strength providing layer R1. The modified polyethylene had a density of 925 kg/cm$^3$ and an infrared absorbance Z of 0.3. A blend of ethylene-vinyl alcohol copolymer (EVOH) and high density polyethylene was used as the resin B of fuel permeation resistance layer R2, in which the blend had a mixing volume ratio of 50/50 (the polyamide/the polyethylene). Polyamide 6 reinforced with glass fiber was used as the resin C of fuel permeation resisting material R3. The glass fiber-reinforced polyamide 6 contained 30% by weight of glass fiber. As a result of repetition of the procedure, a welded part of a welded structure as shown in FIG. 2 was produced. The thus produced welded part exhibited an excellent performance including a fuel permeation coefficient (for the welded part) of 0.4 mg/part(the welded part)/day and a welding strength of 19.2 MPa.

Example 10

By employing the same materials (resins) as those of Example 2 with the exception that polyethylene modified with maleic anhydride was used as the resin A of welding strength providing layer R1, the modified polyethylene having a density of 925 kg/cm$^3$ and an infrared absorbance Z of 0.3, and polyamide 6 reinforced with glass fiber (containing 30% by weight of glass fiber) was used as the resin C of fuel permeation resisting material R3, a welded part of a welded structure as shown in FIG. 3 was produced. The thus produced welded part exhibited an excellent performance including a fuel permeation coefficient (for the welded part) of 0.5 mg/part(the welded part)/day and a welding strength of 21.1 MPa.

Example 11

By employing the same materials (resins) as those of Example 2 with the exception that polyethylene modified with maleic anhydride was used as the resin A of welding strength providing layer R1, the modified polyethylene having a density of 925 kg/cm$^3$ and an infrared absorbance Z of 0.3, and polyamide 6 reinforced with glass fiber (containing 30% by weight of glass fiber) was used as the resin C of fuel permeation resisting material R3, a welded part of a welded structure as shown in FIG. 4 was produced. The thus produced welded part exhibited an excellent performance including a fuel permeation coefficient (for the welded part) of 1.1 mg/part(the welded part)/day and a welding strength of 19.2 MPa.

Example 12

By employing the same materials (resins) as those of Example 2 with the exception that polyethylene modified with maleic anhydride was used as the resin A of welding strength providing layer R1, the modified polyethylene having a density of 925 kg/cm$^3$ and an infrared absorbance Z of 0.3, and polyamide 6 reinforced with glass fiber (containing 30% by weight of glass fiber) was used as the resin C of fuel permeation resisting material R3, a welded part of a welded structure as shown in FIG. 5 was produced. The thus produced welded part exhibited an excellent performance including a fuel permeation coefficient (for the welded part) of 0.2 mg/part(the welded part)/day and a welding strength of 26.2 MPa.

Example 13

By employing the same materials (resins) as those of Example 2 with the exception that a blend of polyacetal (POM) and high density polyethylene (in a mixing volume ratio of 50/50) was used as the resin B of the fuel permeation resistance layer R2, and polyacetal was used as the resin C of fuel permeation resisting material R3, a welded part of a welded structure as shown in FIG. 3 was produced. The thus produced welded part exhibited an excellent performance including a fuel permeation coefficient (for the welded part) of 0.9 mg/part(the welded part)/day and a welding strength of 18.2 MPa.

Example 14

By employing the same materials (resins) as those of Example 2 with the exception that a blend of polybutylene terephthalate (PBT) and high density polyethylene (in a mixing volume ratio of 50/50) was used as the resin B of fuel permeation resistance layer R2, and polybutylene terephthalate was used as the resin C of fuel permeation resisting material R3, a welded part of a welded structure as shown in FIG. 3 was produced. The thus produced welded part exhibited an excellent performance including a fuel permeation coefficient (for the welded part) of 0.6 mg/part(the welded part)/day and a welding strength of 17.5 MPa.

Example 15

By employing the same materials (resins) as those of Example 2 with the exception that a blend of polybutylene terephthalate (PBT) and high density polyethylene (in a mixing volume ratio of 50/50) was used as the resin B of the fuel permeation resistance layer R2, and polybutylene terephthalate reinforced with glass fiber (containing 30% by weight of glass fiber) was used as the resin C of fuel permeation resisting material R3, a welded part of a welded structure as shown in FIG. 3 was produced. The thus produced welded part exhibited an excellent performance including a fuel permeation coefficient (for the welded part) of 0.5 mg/part(the welded part)/day and a welding strength of 17.1 MPa.

Example 16

By employing the same materials (resins) as those of Example 2 with the exception that polyethylene modified with maleic anhydride was used as the resin A of welding strength providing layer R1, the modified polyethylene having a density of 925 kg/cm$^3$ and an infrared absorbance Z of 0.3, and polyamide 6 reinforced with glass fiber (containing 30% by weight of glass fiber) was used as the resin C of fuel permeation resisting material R3, a welded part of a welded structure as shown in FIG. 6 was produced. The thus produced welded part exhibited an excellent performance including a fuel permeation coefficient (for the welded part) of 0.9 mg/part(the welded part)/day and a welding strength of 19.7 MPa.

Example 17

By employing the same materials (resins) as those of Example 2 with the exception that polyethylene modified with maleic anhydride was used as the resin A of welding strength providing layer R1, the modified polyethylene having a density of 925 kg/cm$^3$ and an infrared absorbance Z of 0.3, and polyamide 6 reinforced with glass fiber (containing 30% by weight of glass fiber) was used as the resin C of fuel permeation resisting material R3, a welded part of a welded structure as shown in FIG. 7 was produced. The thus produced welded part exhibited an excellent performance including a fuel permeation coefficient (for the welded part) of 0.8 mg/part(the welded part)/day and a welding strength of 20.4 MPa.

Example 18

By employing the same materials (resins) as those of Example 2 with the exception that polyethylene modified with maleic anhydride was used as the resin A of welding strength providing layer R1, the modified polyethylene having a density of 925 kg/cm$^3$ and an infrared absorbance Z of 0.3, and polyamide 6 reinforced with glass fiber (containing 30% by weight of glass fiber) was used as the resin C of fuel permeation resisting material R3, a welded part (the height difference h=0.5 mm) of a welded structure as shown in FIG. 8 was produced. The thus produced welded part exhibited an excellent performance including a fuel permeation coefficient (for the welded part) of 0.5 mg/part (the welded part)/day and a welding strength of 24.6 MPa.

Example 19

By employing the same materials (resins) as those of Example 2 with the exception that polyethylene modified with maleic anhydride was used as the resin A of welding strength providing layer R1, the modified polyethylene having a density of 925 kg/cm$^3$ and an infrared absorbance Z of 0.3, and polyamide 6 reinforced with glass fiber (containing 30% by weight of glass fiber) was used as the resin C of fuel permeation resisting material R3, a welded part of a welded structure as shown in FIG. 9 was produced (the width of groove=0.5 mm, and the depth j of groove=0.5 mm). The thus produced welded part exhibited an excellent performance including a fuel permeation coefficient (for the welded part) of 0.4 mg/part(the welded part)/day and a welding strength of 27.2 MPa.

Example 20

By employing the same materials (resins) as those of Example 2 with the exception that polyethylene modified with maleic anhydride was used as the resin A of welding strength providing layer R1, the modified polyethylene having a density of 925 kg/cm$^3$ and an infrared absorbance Z of 0.3, and polyamide 6 reinforced with glass fiber (containing 30% by weight of glass fiber) was used as the resin C of fuel permeation resisting material R3, a welded part of a welded structure as shown in FIG. 9 was produced (the width k of the groove=2.0 mm, and the depth j of the groove=2.0 mm). The thus produced welded part exhibited an excellent performance including a fuel permeation coefficient (for the welded part) of 0.4 mg/part(the welded part)/day and a welding strength of 26.9 MPa.

Comparative Example 1

High density polyethylene was used as a resin A of welding strength providing layer R1, as a resin B of fuel permeation resistance layer R2 and as a resin C of Fuel permeation resisting material R3. By employing the resins A, B and C, a welded part of a welded structure as shown in FIG. 2 was produced. The thus produced welded part exhibited a performance including a fuel permeation coefficient (for the welded part) of 35 mg/part(the welded part)/day and a welding strength of 23.6 MPa.

Comparative Example 2

A procedure of Example 2 was repeated with the exception that polyamide 6 was used as the resin B of fuel permeation resistance layer R2, and polyamide 6 reinforced with glass fiber (containing 30% by weight of glass fiber) was used as the resin C of fuel permeation resisting material R3, thereby producing a welded part of a welded structure as shown in FIG. 2. The thus produced welded part exhibited a performance including a fuel permeation coefficient (for the welded part) of 0.2 mg/part(the welded part)/day and a welding strength of 5.0 MPa.

Comparative Example 3

A procedure of Example 2 was repeated with the exception that polyethylene modified with maleic anhydride was used as the resin A of welding strength providing layer R1, the modified polyethylene having a density of 920 kg/cm$^3$ and an infrared absorbance Z of 0.3, and polyamide 6 reinforced with glass fiber (containing 30% by weight of glass fiber) was used as the resin C of fuel permeation resisting material R3, thereby producing a welded part of a welded structure as shown in FIG. 2. The thus produced welded part exhibited a performance including a fuel permeation coefficient (for the welded part) of 1.9 mg/part(the welded part)/day and a welding strength of 4.4 MPa, in which the resin A made its matrix breaking.

Comparative Example 4

A procedure of Example 2 was repeated with the exception that polyethylene modified with maleic anhydride was used as the resin A of welding strength providing layer R1, the modified polyethylene having a density of 945 kg/cm$^3$ and an infrared absorbance Z of 0.9, and polyamide 6 reinforced with glass fiber (containing 30% by weight of glass fiber) was used as the resin C of fuel permeation resisting material R3, thereby producing a welded part of a welded structure as shown in FIG. 2. The thus produced welded part exhibited a performance including a fuel permeation coefficient (for the welded part) of 4.1 mg/part(the welded part)/day and a welding strength of 7.1 MPa.

Comparative Example 5

By employing the same materials (resins) as those of Example 2 with the exception that polyamide 6 reinforced with glass fiber (containing 30% by weight of glass fiber) was used as the resin C of fuel permeation resisting material R3, a welded part (the height difference h=2.5 mm) of a welded structure as shown in FIG. 8 was produced. The thus produced welded part exhibited a performance including a fuel permeation coefficient (for the welded part) of 25 mg/part(the welded part)/day and a welding strength of 4.7 MPa.

The materials of the welded part and the results of performance evaluations of Examples 1 to 20 and Comparative Examples 1 to 5 are shown in Tables 1A and 1B.

As apparent from the results in Tables 1A and 1B, it has been confirmed that the welded parts of Examples 1 to 20 are low in fuel permeation coefficient and high in welding strength as compared with those of Comarative Examples 1 to 5, and therefore the welded part according to the present invention have sufficient fuel permeation resistance and welding strength.

Example 21

High density polyethylene was used as a resin A of Welding strength providing layer R1. A blend of polyamide 6 (PA6) and high density polyethylene was used as a resin B of fuel permeation resistance layer R2, in which the blend had a mixing volume ratio of 50/50 (the polyamide/the polyethylene). By employing the resins A and B, a welded part of a welded structure in FIG. 10 was produced. The thus produced welded part exhibited an excellent performance including a fuel permeation coefficient (for the welded part) of 2 mg/part(the welded part)/day and a welding strength of 18.9 MPa.

Example 22

A procedure of Example 21 was repeated with the exception that the blend of polyamide 6 (PA6) and high density polyethylene used as the resin B of Fuel permeation resistance layer R2 had a mixing volume ratio of 80/20 (the polyamide/the polyethylene), thereby producing a welded part of a welded structure as shown in FIG. 10. The thus produced welded part exhibited an excellent performance including a fuel permeation coefficient (for the welded part) of 1 mg/part(the welded part)/day and a welding strength of 14.2 MPa.

Example 23

A procedure of Example 21 was repeated with the exception that the blend of polyamide 6 (PA6) and high density polyethylene used as the resin B of Fuel permeation resistance layer R2 had a mixing volume ratio of 20/80 (the polyamide/the polyethylene), thereby producing a welded part of a welded structure as shown in FIG. 10. The thus produced welded part exhibited an excellent performance including a fuel permeation coefficient (for the welded part) of 20 mg/part(the welded part)/day and a welding strength of 18.9 MPa.

Example 24

By employing the same materials (resins) as those of Example 21, a welded part of a welded structure as shown in FIG. 11 was produced. The thus produced welded part exhibited an excellent performance including a fuel permeation coefficient (for the welded part) of 4 mg/part(the welded part)/day and a welding strength of 16.6 MPa.

Example 25

By employing the same materials (resins) as those of Example 21 with the exception that a blend of polyacetal (POM) and high density polyethylene (in a mixing volume ratio of 50/50) was used as the resin B of the fuel permeation resistance layer R2, a welded part of a welded structure as shown in FIG. 10 was produced. The thus produced welded part exhibited an excellent performance including a fuel permeation coefficient (for the welded part) of 2 mg/part(the welded part)/day and a welding strength of 18.9 MPa.

Example 26

By employing the same materials (resins) as those of Example 21 with the exception that a blend of ethylene-vinyl alcohol copolymer (EVOH) and high density polyethylene (in a mixing volume ratio of 50/50) was used as the resin B of the fuel permeation resistance layer R2, a welded part of a welded structure as shown in FIG. 10 was produced. The thus produced welded part exhibited an excellent performance including a fuel permeation coefficient (for the welded part) of 1 mg/part(the welded part)/day and a welding strength of 18.9 MPa.

Example 27

By employing the same materials (resins) as those of Example 21 with the exception that polyethylene modified with maleic anhydride was used as the resin A of welding strength providing layer R1, the modified polyethylene having a density of 950 kg/cm$^3$ and an infrared absorbance Z of 0.3, a welded part of a welded structure as shown in FIG. 10 was produced. The thus produced welded part exhibited an excellent performance including a fuel permeation coefficient (for the welded part) of 2 mg/part(the welded part)/day and a welding strength of 18.9 MPa.

Example 28

By employing the same materials (resins) as those of Example 21 with the exception that polyethylene modified with maleic anhydride was used as the resin A of welding strength providing layer R1, the modified polyethylene having a density of 925 kg/cm$^3$ and an infrared absorbance Z of 0.3, a welded part of a welded structure as shown in FIG. 10 was produced. The thus produced welded part exhibited an excellent performance including a fuel permeation coefficient (for the welded part) of 2 mg/part(the welded part)/day and a welding strength of 14.2 MPa.

Example 29

By employing the same materials (resins) as those of Example 21 with the exception that polyethylene modified with maleic anhydride was used as the resin A of welding strength providing layer R1, the modified polyethylene having a density of 940 kg/cm$^3$ and an infrared absorbance Z of 0.8, a welded part of a welded structure as shown in FIG. 10 was produced. The thus produced welded part exhibited an excellent performance including a fuel permeation coefficient (for the welded part) of 2 mg/part(the welded part)/day and a welding strength of 11.8 MPa.

Example 30

By employing the same materials (resins) as those of Example 21, a welded part of a welded structure as shown in FIG. 12 was produced. The thus produced welded part exhibited an excellent performance including a fuel permeation coefficient (for the welded part) of 1 mg/part(the welded part)/day and a welding strength of 18.9 MPa.

Example 31

By employing the same materials (resins) as those of Example 21, a welded part of a welded structure as shown in FIG. 13 was produced. The thus produced welded part exhibited an excellent performance including a fuel permeation coefficient (for the welded part) of 3 mg/part(the welded part)/day and a welding strength of 18.9 MPa.

Example 32

By employing the same materials (resins) as those of Example 21, a welded part (the height difference h=0.5 mm) of a welded structure as shown in FIG. 14 was produced. The thus produced welded part exhibited an excellent performance including a fuel permeation coefficient (for the welded part) of 2 mg/part(the welded part)/day and a welding strength of 23.6 MPa.

Example 33

By employing the same materials (resins) as those of Example 21, a welded part (the width k of the groove=0.5 mm, the depth j of the groove=0.5 mm) of a welded structure as shown in FIG. 15 was produced. The thus produced welded part exhibited an excellent performance including a fuel permeation coefficient (for the welded part) of 2 mg/part (the welded part)/day and a welding strength of 23.6 MPa.

Example 34

By employing the same materials (resins) as those of Example 21, a welded part (the width k of the groove=2.0 mm, the depth j of the groove=2.0 mm) of a welded structure as shown in FIG. 15 was produced. The thus produced welded part exhibited an excellent performance including a fuel permeation coefficient (for the welded part) of 2 mg/part (the welded part)/day and a welding strength of 15.4 MPa.

Comparative Example 6

A procedure of Example 21 was repeated with the exception that high density polyethylene was used as the resin B of fuel permeation resistance layer R2, thereby producing a welded part of a welded structure as shown in FIG. 10. The thus produced welded part exhibited a performance including a fuel permeation coefficient (for the welded part) of 35 mg/part(the welded part)/day and a welding strength of 23.6 MPa.

Comparative Example 7

A procedure of Example 21 was repeated with the exception that polyamide 6 was used as the resin B of fuel permeation resistance layer R2, thereby producing a welded part of a welded structure as shown in FIG. 10. The thus produced welded part exhibited a performance including a fuel permeation coefficient (for the welded part) of 1 mg/part (the welded part)/day and a welding strength of 8.3 MPa.

Comparative Example 8

A procedure of Example 22 was repeated with the exception that polyethylene modified with maleic anhydride was used as the resin A of welding strength providing layer R1, the modified polyethylene having a density of 920 kg/cm$^3$ and an infrared absorbance Z of 0.3, thereby producing a welded part of a welded structure as shown in FIG. 10. The thus produced welded part exhibited a performance including a fuel permeation coefficient (for the welded part) of 4 mg/part(the welded part)/day and a welding strength of 8.3 MPa, in which the resin A made its matrix breaking.

Comparative Example 9

A procedure of Example 22 was repeated with the exception that polyethylene modified with maleic anhydride was used as the resin A of welding strength providing layer R1, the modified polyethylene having a density of 945 kg/cm$^3$ and an infrared absorbance Z of 0.9, thereby producing a welded part of a welded structure as shown in FIG. 10. The thus produced welded part exhibited a performance including a fuel permeation coefficient (for the welded part) of 4 mg/part(the welded part)/day and a welding strength of 7.1 MPa.

Comparative Example 10

By employing the same materials (resins) as those of Example 21, a welded part (the width k of the groove=2.5 mm, the depth j of the groove=2.5 mm) of a welded structure as shown in FIG. 15 was produced. The thus produced welded part exhibited a performance including a fuel permeation coefficient (for the welded part) of 70 mg/part(the welded part)/day and a welding strength of 4.7 MPa.

The materials of the welded part and the results of performance evaluations of Examples 21 to 34 and Comparative Examples 6 to 10 are shown in Table 2.

As will be understood from the results in Table 2, it has been confirmed that the welded parts of Examples 21 to 34 are low in fuel permeation coefficient and high in welding strength as compared with those of Comparative Examples 6 to 10, and therefore the welded parts according to the present invention have sufficient fuel permeation resistance and welding strength.

As appreciated from the above, according to the present invention, by virtue of the welding strength providing layer forming part of the welding section of the welded part, sufficient welding strength and impact resistance can be obtained. Additionally, by virtue of the fuel permeation resistance layer or the fuel permeation resisting material, fuel permeation through the welding section and the pipe-shaped section of the welded part and fuel permeation around the interface between the pipe-shaped section and the joined part can be sufficiently suppressed. As a result, both maintaining a high welding strength and improving a fuel permeation resistance performance can be effectively achieved, offering a welded structure provided with a high welding strength and a high fuel permeation resistance.

The entire contents of Japanese Patent Application P2002-071296 (filed Mar. 15, 2002) and P2002-206132 (filed Jul. 15, 2002) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

TABLE 1A

| Sample | Resin A Material | Density (kg/m$^3$) | Infrared absorbance Z | Resin B Material | Mixing volume ratio |
|---|---|---|---|---|---|
| Example 1 | Maleic anhydride-modified polyethylene | 925 | 0.3 | Polyamide 6/HDPE | 50/50 |
| Example 2 | High density polyethylene | 945 | 0 | Polyamide 6/HDPE | 50/50 |
| Example 3 | High density polyethylene | 945 | 0 | Polyamide 6/HDPE | 20/80 |
| Example 4 | High density polyethylene | 945 | 0 | Polyamide 6/HDPE | 80/20 |
| Example 5 | High density polyethylene | 945 | 0 | Polyamide 6/HDPE | 50/50 |
| Example 6 | Maleic anhydride-modified polyethylene | 950 | 0.3 | Polyamide 6/HDPE | 50/50 |
| Example 7 | Maleic anhydride-modified polyethylene | 925 | 0.3 | Polyamide 6/HDPE | 50/50 |
| Example 8 | Maleic anhydride-modified polyethylene | 940 | 0.8 | Polyamide 6/HDPE | 50/50 |
| Example 9 | Maleic anhydride-modified polyethylene | 925 | 0.3 | EVOH/HDPE | 50/50 |
| Example 10 | Maleic anhydride-modified polyethylene | 925 | 0.3 | Polyamide 6/HDPE | 50/50 |
| Example 11 | Maleic anhydride-modified polyethylene | 925 | 0.3 | Polyamide 6/HDPE | 50/50 |
| Example 12 | Maleic anhydride-modified polyethylene | 925 | 0.3 | Polyamide 6/HDPE | 50/50 |
| Example 13 | High density polyethylene | 945 | 0 | POM/HDPE | 50/50 |
| Example 14 | High density polyethylene | 945 | 0 | PBT/HDPE | 50/50 |
| Example 15 | High density polyethylene | 945 | 0 | PBT/HDPE | 50/50 |
| Example 16 | Maleic anhydride-modified polyethylene | 925 | 0.3 | Polyamide 6/HDPE | 50/50 |
| Example 17 | Maleic anhydride-modified polyethylene | 925 | 0.3 | Polyamide 6/HDPE | 50/50 |
| Example 18 | Maleic anhydride-modified polyethylene | 925 | 0.3 | Polyamide 6/HDPE | 50/50 |
| Example 19 | Maleic anhydride-modified polyethylene | 925 | 0.3 | Polyamide 6/HDPE | 50/50 |
| Example 20 | Maleic anhydride-modified polyethylene | 925 | 0.3 | Polyamide 6/HDPE | 50/50 |
| Compar. example 1 | High density polyethylene | 945 | 0 | Polyamide 6/HDPE | 0/100 |
| Compar. example 2 | High density polyethylene | 945 | 0 | Polyamide 6/HDPE | 100/0 |
| Compar. example 3 | Maleic anhydride-modified polyethylene | 920 | 0.3 | Polyamide 6/HDPE | 50/50 |
| Compar. example 4 | Maleic anhydride-modified polyethylene | 945 | 0.9 | Polyamide 6/HDPE | 50/50 |
| Compar. example 5 | High density polyethylene | 945 | 0 | Polyamide 6/HDPE | 50/50 |

TABLE 1B

| Sample | Resin C Material | Structure | Height difference or groove dimension (mm) | Part fuel permeation coefficient (mg/part/day) | Welding strength (MPa) |
|---|---|---|---|---|---|
| Example 1 | Glass fiber-reinforced polyamide 6 | FIG. 1 | 40 | 0.2 | 22.3 |
| Example 2 | Polyamide 6 | FIG. 2 | | 0.5 | 19.1 |
| Example 3 | Polyamide 6 | FIG. 2 | | 0.7 | 15.6 |
| Example 4 | Polyamide 6 | FIG. 2 | | 0.5 | 20.3 |
| Example 5 | Glass fiber-reinforced polyamide 6 | FIG. 2 | | 0.5 | 19.5 |
| Example 6 | Glass fiber-reinforced polyamide 6 | FIG. 2 | 45 | 0.5 | 21.2 |
| Example 7 | Glass fiber-reinforced polyamide 6 | FIG. 2 | | 0.7 | 20.9 |
| Example 8 | Glass fiber-reinforced polyamide 6 | FIG. 2 | | 0.6 | 17.3 |
| Example 9 | Glass fiber-reinforced polyamide 6 | FIG. 2 | | 0.4 | 19.2 |
| Example 10 | Glass fiber-reinforced polyamide 6 | FIG. 3 | | 0.5 | 21.1 |
| Example 11 | Glass fiber-reinforced polyamide 6 | FIG. 4 | 50 | 1.1 | 19.2 |
| Example 12 | Glass fiber-reinforced polyamide 6 | FIG. 5 | | 0.2 | 26.2 |
| Example 13 | Polyacetal | FIG. 3 | | 0.9 | 18.2 |
| Example 14 | PBT | FIG. 3 | | 0.6 | 17.5 |
| Example 15 | Glass fiber-reinforced PBT | FIG. 3 | | 0.5 | 17.1 |
| Example 16 | Glass fiber-reinforced polyamide 6 | FIG. 6 | 55 | 0.9 | 19.7 |
| Example 17 | Glass fiber-reinforced polyamide 6 | FIG. 7 | | 0.8 | 20.4 |
| Example 18 | Glass fiber-reinforced polyamide 6 | FIG. 8 | 0.5 | 0.5 | 24.6 |
| Example 19 | Glass fiber-reinforced polyamide 6 | FIG. 9 | 0.5 | 0.4 | 27.2 |
| Example 20 | Glass fiber-reinforced polyamide 6 | FIG. 9 | 2.0 | 0.4 | 26.9 |
| Compar. example 1 | High density polyethylene | FIG. 2 | 60 | 3.5 | 23.6 |
| Compar. example 2 | Glass fiber-reinforced polyamide 6 | FIG. 2 | | 0.2 | 5.0 |
| Compar. example 3 | Glass fiber-reinforced polyamide 6 | FIG. 2 | | 1.9 | 4.4 (resin A made matrix breaking) |
| Compar. example 4 | Glass fiber-reinforced polyamide 6 | FIG. 2 | | 4.1 | 7.1 |
| Compar. example 5 | Glass fiber-reinforced polyamide 6 | FIG. 8 | 65  2.5 | 2.5 | 4.7 |

TABLE 2

| Sample | Resin A Material | Resin A Density (kg/m³) | Resin A Infrared absorbance Z | Resin B Material | Resin B Mixing volume ratio | Structure | Height difference or groove dimension (mm) | Part fuel permeation coefficient (mg/part/day) | Welding strength (MPa) |
|---|---|---|---|---|---|---|---|---|---|
| Example 21 | High density polyethylene | 945 | 0 | Polyamide 6/HDPE | 50/50 | FIG. 10 | | 2 | 18.9 |
| Example 22 | High density polyethylene | 945 | 0 | Polyamide 6/HDPE | 80/20 | FIG. 10 | | 1 | 14.2 |
| Example 23 | High density polyethylene | 945 | 0 | Polyamide 6/HDPE | 20/80 | FIG. 10 | | 20 | 18.9 |
| Example 24 | High density polyethylene | 945 | 0 | Polyamide 6/HDPE | 50/50 | FIG. 11 | | 4 | 16.6 |
| Example 25 | High density polyethylene | 945 | 0 | POM/HDPE | 50/50 | FIG. 10 | | 2 | 18.9 |
| Example 26 | High density polyethylene | 945 | 0 | EVOH/HDPE | 50/50 | FIG. 10 | | 1 | 18.9 |
| Example 27 | Maleic anhydride-modified polyethylene | 950 | 0.3 | Polyamide 6/HDPE | 50/50 | FIG. 10 | | 2 | 18.9 |
| Example 28 | Maleic anhydride-modified polyethylene | 925 | 0.3 | Polyamide 6/HDPE | 50/50 | FIG. 10 | | 2 | 14.2 |
| Example 29 | Maleic anhydride-modified polyethylene | 940 | 0.8 | Polyamide 6/HDPE | 50/50 | FIG. 10 | | 2 | 11.8 |
| Example 30 | High density polyethylene | 945 | 0 | Polyamide 6/HDPE | 50/50 | FIG. 12 | | <1 | 18.9 |
| Example 31 | High density polyethylene | 945 | 0 | Polyamide 6/HDPE | 50/50 | FIG. 13 | | 3 | 18.9 |
| Example 32 | High density polyethylene | 945 | 0 | Polyamide 6/HDPE | 50/50 | FIG. 14 | 0.5 | 2 | 23.6 |
| Example 33 | High density polyethylene | 945 | 0 | Polyamide 6/HDPE | 50/50 | FIG. 15 | 0.5 | 2 | 23.6 |
| Example 34 | High density polyethylene | 945 | | Polyamide 6/HDPE | 50/50 | FIG. 15 | 2 | 2 | 15.4 |
| Compar. example 6 | High density polyethylene | 945 | 0 | Polyamide 6/HDPE | 0/100 | FIG. 10 | | 35 | 23.6 |
| Compar. example 7 | High density polyethylene | 945 | 0 | Polyamide 6/HDPE | 100/0 | FIG. 10 | | 1 | 8.3 |
| Compar. example 8 | Maleic anhydride-modified polyethylene | 920 | 0.3 | Polyamide 6/HDPE | 50/50 | FIG. 10 | | 4 | 8.3 |
| Compar. example 9 | Maleic anhydride-modified polyethylene | 945 | 0.9 | Polyamide 6/HDPE | 50/50 | FIG. 10 | 2.5 | 4 | 7.1 (resin A made matrix breaking) |
| Compar. example 10 | High density polyethylene | 945 | 0 | Polyamide 6/HDPE | 50/50 | FIG. 15 | 2.5 | 70 | 4.7 |

What is claimed is:

1. A welded structure, comprising:

a fuel filling container having a section defining an opening; and a welded part including a pipe-shaped section which has a first end portion disposed in the opening of the fuel filling container, and an annular welding section fixedly disposed around the outer periphery of the pipe-shaped section, the welding section being welded through an annular welding surface to an outer surface of the fuel filling container at a section surrounding the opening of the fuel filling container, wherein the welding section of the welded part includes an annular welding strength providing layer and an annular fuel permeation resistance layer which are coaxial with the pipe-shaped section of the welded part and radially laminated to define the annular welding surface, wherein at least an inner peripheral surface portion of the pipe-shaped section and an outer peripheral surface portion of a second end portion of the pipe-shaped section are formed of a fuel permeation resisting material, such that a joined part may be connected to the second end portion of the pipe-shaped section, wherein the welding strength providing layer of the welding section of the welded part is formed of polyethylene, and the fuel permeation resistance layer of the welding section and the fuel permeation resisting material of the pipe-shaped section of the welded part are formed of a blend resin made of a polyethylene containing 20 to 80% by volume of at least one selected from the group consisting of polyamide, ethylene-vinyl alcohol copolymer, polyacetal and polyester.

2. A welded structure as claimed in claim 1, wherein the polyethylene forming the welding strength providing layer is modified polyethylene which has been modified by introducing maleic anhydride group into polyethylene, wherein the modified polyethylene has an infrared absorbance Z represented by Eq. (1), within a range of from more than 0 to not more than 0.8 and a density ranging from 925 to 950 kg/m$^3$:

$$Z = I_{1792}/I_{4250} + I_{1700}/I_{4250} \qquad \text{Eq. (1)}$$

where $I_{1792}$, $I_{4250}$, $I_{1700}$ and $I_{4250}$ are respectively the peak heights of infrared absorption spectrums at wave numbers 1792, 4250, 1700 and 4250 cm$^{-1}$.

3. A welded structure as claimed in claim 1, wherein the fuel permeation resistance layer of the welding section of the welded part is formed of a blend resin made of polyethylene containing 20 to 80% by volume of at least one selected from the group consisting of polyamide and ethylene-vinyl alcohol copolymer, and the fuel permeation resisting material of the pipe-shaped section of the welded part is one of polyamide and polyamide reinforced with glass fiber.

4. A welded structure as claimed in claim 1, wherein the fuel permeation resistance layer of the welding section of the welded part is formed of a blend resin made of polyethylene containing 20 to 80% by volume of polyacetal, and the fuel permeation resisting material of the pipe-shaped section of the welded part is one of polyacetal and polyacetal reinforced with glass fiber.

5. A welded structure as claimed in claim 1, wherein the fuel permeation resistance layer of the welding section of the welded part is formed of a blend resin made of polyethylene containing 20 to 80% by volume of polyester, and the fuel permeation resisting material of the pipe-shaped section of the welded part is one of polyester and polyester reinforced with glass fiber.

6. A welded structure as claimed in claim 1, wherein the inner peripheral surface portion and the outer peripheral surface portion of the second end portion of the pipe-shaped section of the welded part is formed of a material for providing a welding strength.

7. A welded structure as claimed in claim 1, wherein the fuel filling container has a wall comprising a plurality of layers including at least one fuel permeation resistance layer, the opening being formed piercing the wall, wherein the fuel permeation resistance layer of the welding section of the welded part extends into the opening of the fuel filling container to cover a range from the outer surface of the fuel filling container to at lest one of the fuel permeation resistance layer.

8. A welded structure as claimed in claim 1, wherein the second end portion of the pipe-shaped section of the welded part is formed at its outer peripheral surface with a projection to which a joined part is to be joined.

9. A welded structure as claimed in claim 1, wherein the fuel permeation resistance layer is located radially inward of the welding strength providing layer.

10. A welded structure as claimed in claim 1, further comprising a joined part jointed to the second end portion of the pipe-shaped section of the welded part, the first end portion of the pipe-shaped section being connected to the fuel filling container, wherein a surface of a part of the pipe-shaped section located between the joined part and the welding section is covered with a material for providing a welding strength.

11. A welded structure as claimed in claim 1, wherein the polyethylene is one of high density polyethylene and polyethylene modified with maleic anhydride.

12. A welded structure as claimed in claim 7, wherein the fuel filling container wall comprises a plurality of fuel permeation resistance layers and wherein the fuel permeation resistance layer of the welding section of the welded part extends into the opening of the fuel filling container to cover a range from the outer surface of the fuel filling container to the fuel permeation resistance layer which is located nearest the outer surface of the fuel filling container with respect to the other fuel permeation resistance layer or layers.

13. A method of welding a welding part to a fuel filling container, the welding part including a pipe-shaped section, the fuel filling container being formed with an opening, the method comprising:

forming an annular welding section having an annular welding surface facing an outer surface of the fuel filling container, fixedly around an outer periphery of the pipe-shaped section, the welding section including an annular welding strength providing layer, and an annular fuel permeation resistance layer which are coaxial with the pipe-shaped section of the welded part and radially laminated to define the annular welding surface;

forming at least an inner peripheral surface portion of the pipe-shaped section and an outer peripheral surface portion of a first end portion of the pipe-shaped section, of a fuel permeation resisting material, a joined part being to be connected to the first end portion;

disposing a second end portion of the pipe-shaped section of the welded part in the opening of the fuel filling container; and welding the welding section of the welded part through the welding surface to the outer surface of the fuel filling container at a section around the opening;

wherein the forming the annular welding section includes forming one layer selected from the group consisting of the welding strength providing layer and the fuel permeation resistance layer in a manner to project toward the outer surface of the fuel filling container relative to the other layer, the one layer being formed of a first synthetic resin, the other layer being formed of a second synthetic resin which is lower in viscosity than the first synthetic resin, wherein the welding section of the welded part is welded through the welding surface to the outer surface of the fuel filling container at the part around the opening after the forming of the one layer; and wherein a height difference ranging from 0.5 mm to 2 mm is formed between a first surface of the one layer and a second surface of the other layer, the first and second layer corresponding to the welding surface.

14. A method of welding a welding part to a fuel filling container, the welding part including a pipe-shaped section, the fuel filling container being formed with an opening, the method comprising:

forming an annular welding section having an annular welding surface facing an outer surface of the fuel filling container, fixedly around an outer periphery of the pipe-shaped section, the welding section including an annular welding strength providing layer, and an annular fuel permeation resistance layer which are coaxial with the pipe-shaped section of the welded part and radially laminated to define the annular welding surface;

forming at least an inner peripheral surface portion of the pipe-shaped section and an outer peripheral surface portion of a first end portion of the pipe-shaped section, of a fuel permeation resisting material, a joined part being to be connected to the first end portion;

disposing a second end portion of the pipe-shaped section of the welded part in the opening of the fuel filling container; and welding the welding section of the welded part through the welding surface to the outer surface of the fuel filling container at a section around the opening;

wherein the forming of the annular welding section includes forming an annular groove between the welding strength providing layer and the fuel permeation resistance layer, at the welding surface facing the outer surface of the fuel filling container; and wherein the groove has a width ranging from not less than 0.5 mm to not more than 2 mm, and a depth ranging from not less than 0.5 mm to not more than 2 mm.

* * * * *